US012018590B1

(12) United States Patent
Cervetto et al.

(10) Patent No.: US 12,018,590 B1
(45) Date of Patent: Jun. 25, 2024

(54) METHOD FOR TURBINE BLADE AND ASSEMBLY WITH DOVETAIL ARRANGEMENT FOR ENLARGED ROTOR GROOVE

(71) Applicant: General Electric Company, Schenectady, NY (US)

(72) Inventors: Federico Cervetto, Zurich (CH); Salvador Mata López, Guanajuato (MX); Steven Sebastian Burdgick, Schnectady, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/295,413

(22) Filed: Apr. 4, 2023

(51) Int. Cl.
*F01D 5/30* (2006.01)

(52) U.S. Cl.
CPC .......... *F01D 5/303* (2013.01); *F05D 2220/30* (2013.01); *F05D 2230/60* (2013.01)

(58) Field of Classification Search
CPC ........... B23P 15/02; B23P 11/00; B23P 15/00; F05D 2230/644; F05D 2220/30; F05D 2230/60; Y10T 29/49316; Y10T 29/4932; Y10T 29/49321; F01D 5/303
USPC .................................. 29/889, 889.2, 889.21
See application file for complete search history.

(56) References Cited

U.S. PATENT DOCUMENTS 2,843,356 A 7/1958 Hull, Jr.
3,216,699 A 11/1965 Schoenborn
3,826,592 A * 7/1974 Raboin .................... B63H 1/16 416/222
3,902,824 A * 9/1975 Sauer .................... F01D 5/3038 416/221
4,304,523 A * 12/1981 Corsmeier ............ F01D 5/3015 403/326
4,645,425 A 2/1987 Morrison, Jr.
4,875,830 A 10/1989 Trousdell et al.
5,318,406 A * 6/1994 Bardes .................... F01D 5/147 29/889.22
7,198,463 B2 * 4/2007 Kanebako ............. F01D 5/3007 416/500

(Continued)

OTHER PUBLICATIONS

U.S. Appl. No. 18/295,408, Office Action dated Nov. 24, 2023, 25 pages.

*Primary Examiner* — Sarang Afzali
*Assistant Examiner* — Darrell C Ford
(74) *Attorney, Agent, or Firm* — Charlotte Wilson; James Pemrick; Hoffman Warnick LLC

(57) ABSTRACT

A method for a turbine blade assembly for a rotor groove is disclosed. A dovetail of the turbine blade includes a mounting arm and an end surface facing radially inward relative to the rotor axis. An extension insert includes a first end configured to contact the end surface of the dovetail and a second end. At least one positioning leg extends radially inward relative to the axis from the second end of the insert. The dovetail and the extension insert are configured to be positioned in the rotor groove to mount the turbine blade to the rotor. The mounting arm engages a radially inward facing rotor hook of the rotor groove and positioning leg(s) engage one of a radially outward facing surface of the rotor groove and a planar plate shim between the positioning leg(s) and the radially outward facing surface of the rotor groove.

12 Claims, 17 Drawing Sheets

(56) References Cited

U.S. PATENT DOCUMENTS

| | | | | |
|---|---|---|---|---|
| 8,511,999 | B1 * | 8/2013 | Kimmel | F01D 5/30 416/193 A |
| 8,821,127 | B1 | 9/2014 | Knecht | |
| 9,394,795 | B1 * | 7/2016 | Kimmel | F01D 5/147 |
| 10,047,865 | B2 * | 8/2018 | Burdgick | F01D 11/001 |
| 2001/0028848 | A1 | 10/2001 | Tempere | |
| 2004/0076521 | A1 * | 4/2004 | Martin | F01D 5/147 416/193 A |
| 2004/0115054 | A1 * | 6/2004 | Balland | F01D 5/18 416/97 R |
| 2005/0207892 | A1 * | 9/2005 | Kanebako | F01D 5/081 416/219 R |
| 2009/0214349 | A1 | 8/2009 | Wiebe et al. | |
| 2010/0189564 | A1 * | 7/2010 | Stone | F01D 5/323 29/889 |
| 2019/0120069 | A1 * | 4/2019 | Burdgick | F01D 5/326 |

* cited by examiner

METHOD FOR TURBINE BLADE AND ASSEMBLY WITH DOVETAIL ARRANGEMENT FOR ENLARGED ROTOR GROOVE

TECHNICAL FIELD

The disclosure relates generally to turbine systems. More specifically, the disclosure relates to methods for a turbine blade and a turbine blade assembly for a turbine system with a dovetail arrangement for an enlarged rotor groove.

BACKGROUND

Turbine systems include stationary nozzles that direct the flow into rotating blades connected to a rotor. The stationary nozzles (airfoil) are typically called a stationary blade, diaphragm, or nozzle assembly stage. The rotating blades receive steam flow, e.g., combustion gases or steam, from the nozzles that forces the blades to turn the rotor. Blades are generally assembled to the rotor using a base having a dovetail that mates with a groove in the rotor and is forced radially outward using thin, plate shims to help create a tight (packed) assembly.

During turbine service outages, certain rotating blade stages may need to be replaced. To ensure proper assembly, the rotor groove may also need to be re-machined to clean up and eliminate any possible damage, e.g., minor cracks or other deformations. The depth of the re-machining of the rotor groove depends on the life consumption of the rotor and may vary between, for example, different locations on the rotor, different blade stages, or different turbine systems. The inside of the rotor groove may be machined to remove, for example, between two and fifteen millimeters, to eliminate any cracked or aged material and increase the lifespan of the rotor. It is a challenge to provide a new blade with a dovetail that fits the new, larger rotor groove, but does not include more weight than the original blade to avoid increased centrifugal forces and stresses on the rotor groove.

BRIEF DESCRIPTION

All aspects, examples and features mentioned below can be combined in any technically possible way.

An aspect of the disclosure provides a turbine blade assembly for a rotor groove defined in a rotor having an axis, the turbine blade assembly comprising: a turbine blade including an airfoil and a dovetail coupled to the airfoil, the dovetail including a mounting arm and an end surface facing radially inward relative to the axis; and an extension insert including a first end configured to contact the end surface of the dovetail and a second end, the second end including at least one positioning leg extending radially inward relative to the axis, wherein the dovetail and the extension insert are configured to be positioned in the rotor groove to mount the turbine blade to the rotor.

Another aspect of the disclosure includes any of the preceding aspects, and the mounting arm engages a radially inward facing rotor hook of the rotor groove and the least one positioning leg engages one of a radially outward facing surface of the rotor groove and a planar plate shim between the at least one positioning leg and the radially outward facing surface of the rotor groove.

Another aspect of the disclosure includes any of the preceding aspects, and the extension insert has a radial extent larger than 4 millimeters.

Another aspect of the disclosure includes any of the preceding aspects, and further comprising at least one planar plate shim between the at least one positioning leg and the radially outward facing surface of the rotor groove, the at least one planar plate shim having a radial extent of no greater than 1.5 millimeter.

Another aspect of the disclosure includes any of the preceding aspects, and further comprising a fixation element locking a position of the extension insert relative to the dovetail of the turbine blade.

Another aspect of the disclosure includes any of the preceding aspects, and the fixation element includes a male-female coupler.

Another aspect of the disclosure includes any of the preceding aspects, and a female portion of the male-female coupler is defined in the end surface of the dovetail, and a male portion of the male-female coupler extends from the first end of the extension insert and is configured to seat within the female portion in the end surface to lock a position of the extension insert relative to the dovetail of the turbine blade.

Another aspect of the disclosure includes any of the preceding aspects, and the fixation element includes a fastener coupling the end surface of the dovetail and the first end of the extension insert together.

Another aspect of the disclosure includes any of the preceding aspects, and the at least one positioning leg includes a plurality of positioning legs extending radially inward relative to the axis.

Another aspect of the disclosure includes any of the preceding aspects, and at least two of the plurality of positioning legs have different lengths.

Another aspect of the disclosure includes any of the preceding aspects, and wherein the extension insert includes a lighter material than a material of the airfoil and the dovetail.

An aspect of the disclosure provides a method, comprising: providing a rotor groove defined in a rotor having an axis, the rotor groove including a radially inward facing rotor hook and a radially outward facing surface; mounting a turbine blade assembly in the rotor groove, the turbine blade assembly including: a turbine blade including an airfoil and a dovetail coupled to the airfoil, the dovetail including a mounting arm and an end surface facing radially inward relative to the axis; and an extension insert including a first end configured to contact the end surface of the dovetail and a second end, the second end including at least one positioning leg extending radially inward relative to the axis.

Another aspect of the disclosure includes any of the preceding aspects, and the mounting arm engages the radially inward facing rotor hook of the rotor groove and the least one positioning leg engages one of the radially outward facing surface of the rotor groove and a planar plate shim between the at least one positioning leg and the radially outward facing surface of the rotor groove. Another aspect of the disclosure includes any of the preceding aspects, and the extension insert has a radial extent larger than 4 millimeters, and further comprising positioning at least one planar plate shim between the at least one positioning leg and the radially outward facing surface of the rotor groove, the at least one planar plate shim having a radial extent of no greater than 1.5 millimeter.

Another aspect of the disclosure includes any of the preceding aspects, and further comprising locking a position of the extension insert relative to the dovetail of the turbine blade using a fixation element.

Another aspect of the disclosure includes any of the preceding aspects, and the fixation element includes a male-female coupler.

Another aspect of the disclosure includes any of the preceding aspects, and a female portion of the male-female coupler is defined in the end surface of the dovetail, and a male portion of the male-female coupler extends from the first end of the extension insert and is configured to seat within the female portion in the end surface to lock a position of the extension insert relative to the dovetail of the turbine blade.

Another aspect of the disclosure includes any of the preceding aspects, and the fixation element includes a fastener coupling the end surface of the dovetail and the first end of the extension insert together.

Another aspect of the disclosure includes any of the preceding aspects, and the at least one positioning leg includes a plurality of positioning legs extending radially inward relative to the axis.

Another aspect of the disclosure includes any of the preceding aspects, and at least two of the plurality of positioning legs have different lengths.

Another aspect of the disclosure includes any of the preceding aspects, and further comprising, prior to mounting a turbine blade assembly in the rotor groove, adjusting the at least one positioning leg such that a first radial distance between the mounting arm and a radially inner end of the at least one positioning leg matches a second radial distance between the radially inward facing rotor hook and the radially outward facing surface of the rotor groove.

An aspect of the disclosure provides a turbine blade for a rotor groove defined in a rotor having an axis, comprising: an airfoil; and a dovetail coupled to the airfoil, the dovetail having a mounting arm and a single positioning leg extending radially inward relative to the axis from a radially inward facing end surface of the dovetail.

Another aspect of the disclosure includes any of the preceding aspects, and a first radial distance between the mounting arm and a radially inner end of the single positioning leg matches a second radial distance between a radially inward facing rotor hook and a radially outward facing surface of the rotor groove.

An aspect of the disclosure provides a method, comprising: providing a rotor groove defined in a rotor having an axis, the rotor groove including a radially inward facing rotor hook and a radially outward facing surface; on a turbine blade including a dovetail having a mounting arm and a single positioning leg extending from a radially inward facing end surface of the dovetail, adjusting the single positioning leg such that a first radial distance between the mounting arm and the radially inner end of the single positioning leg matches a second radial distance between the radially inward facing rotor hook and the radially outward facing surface of the rotor groove; and mounting the dovetail of the turbine blade in the rotor groove.

Another aspect of the disclosure includes any of the preceding aspects, and providing the rotor groove includes machining the rotor groove to enlarge the second radial distance between the radially inward facing rotor hook and the radially outward facing surface of the rotor groove.

Another aspect of the disclosure includes any of the preceding aspects, and further comprising: adjusting the single positioning leg such that the first radial distance between the mounting arm and the radially inner end of the single positioning leg is less than the second radial distance between the radially inward facing rotor hook and the radially outward facing surface of the rotor groove, and wherein the mounting further includes positioning at least one planar plate shim between the single positioning leg and the radially outward facing surface of the rotor groove.

An aspect of the disclosure may include a turbine system comprising a turbine including at least one turbine blade or at least one turbine blade assembly of any of the preceding aspects.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
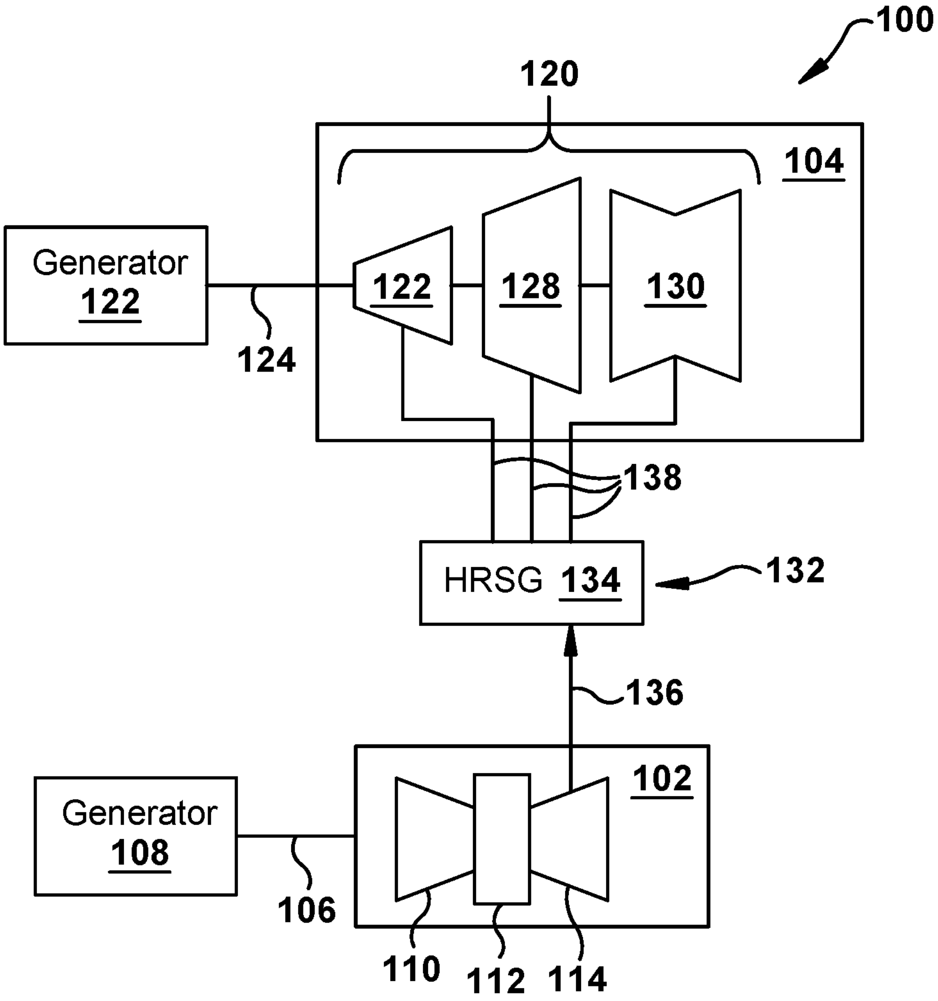
FIG. 1 shows a schematic view of an illustrative combined cycle power plant (CCPP) including a gas turbine and a steam turbine in which teachings of the disclosure can be applied.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

It is often required to describe parts that are at different radial positions with regard to a center axis. The term "axial" refers to movement or position parallel to an axis, e.g., an axis of a rotor of a turbine system. The term "radial" refers to movement or position perpendicular to an axis, e.g., an axis of a rotor of a turbine system. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a radially inward facing end surface of a turbine blade dovetail may extend circumferentially about an axis of a rotor of a turbomachine. As indicated above, it will be appreciated that such terms may be applied in relation to the axis of a rotor of a turbine system.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a turbine blade and a turbine blade assembly for a rotor groove. A dovetail of the turbine blade includes a mounting arm and an end surface facing radially inward relative to the rotor axis. In certain embodiments, an extension insert includes a first end configured to contact the end surface of the dovetail and a second end. At least one positioning leg extends radially inward relative to the axis from the second end of the insert.

The dovetail and the extension insert are configured to be positioned in the rotor groove to mount the turbine blade to the rotor, forming a turbine blade assembly. The mounting arm engages a radially inward facing rotor hook of the rotor groove and the positioning leg(s) engage one of a radially outward facing surface of the rotor groove and a planar plate shim between the positioning leg(s) and the radially outward facing surface of the rotor groove. Other embodiments provide a turbine blade for a rotor groove defined in a rotor having an axis. The turbine blade includes an airfoil, and a dovetail coupled to the airfoil. The dovetail has a mounting arm and a single positioning leg extending radially inward relative to the axis from a radially inward facing end surface of the dovetail. Related methods are also provided.

The various embodiments of turbine blade or turbine blade assembly can be used on all forms of turbine rotor grooves with any groove depth. Advantageously, the various embodiments also provide sufficient material to be re-machined to fit a rotor groove that is enlarged during servicing. The turbine blade or turbine blade assembly can be used in new turbine systems and/or used/retrofitted into any manufacturer's existing units without requiring any new welding. The turbine blade or turbine blade assembly can fit into a new deeper rotor groove that has been serviced to remove any aged rotor area subject to cracking, but does not increase the blade (dovetail) weight. The positioning leg(s) alone can create a tight fit between the rotor hooks and radially outward facing end surface (bottom) of the rotor groove for radial positioning, or the leg(s) may be used with planar plate shim(s) inserted under the leg(s) to provide the tight fit between the rotor hooks and the bottom of the rotor groove.

A turbine blade or turbine blade assembly, as will be described herein, can be used in any turbine system such as but not limited to a gas turbine system and/or a steam turbine system. For purposes of description, the teachings of the disclosure will be mainly described relative to a steam turbine system. However, a combined cycle power plant will be briefly described to simultaneously explain two possible operational settings of the teachings of the disclosure.

Turning to FIG. 1, a schematic view of portions of an illustrative combined cycle power plant (CCPP) 100 are shown. In the instant example, CCPP 100 is a multiple shaft system with two generators, but one with skill in the art will readily understand that the teachings of the disclosure are applicable to any variety of combined cycle power plant. CCPP 100 may include a gas turbine (GT) system 102 and a steam turbine (ST) system 104.

GT system 102 may be mechanically coupled by a shaft 106 to a first generator 108, which generates electrical energy. GT system 102 may include a compressor 110 and a combustor 112. GT system 102 also includes a gas turbine 114 coupled to common compressor/turbine shaft 106. In one embodiment, gas turbine system 102 is a MS7001FB engine, sometimes referred to as a 9FB engine, commercially available from General Electric Company, Greenville, S.C. In one embodiment, GT system 102 is a 7HA.03 engine, commercially available from General Electric Company, Greenville, S.C. The present disclosure is not limited to any one particular GT system and may be implanted in connection with other engines including, for example, the other HA, F, B, LM, GT, TM and E-class engine models of General Electric Company, and engine models of other companies. In operation, air enters the inlet of compressor 110, is compressed and then discharged to combustor 112 where fuel such as a gas, e.g., natural gas, or a fluid, e.g., oil, is burned to provide high energy combustion gases which drive gas turbine 114. In gas turbine 114, the energy of the hot gases is converted into work, some of which is used to drive compressor 110 through rotating shaft 106, with the remainder available for useful work to drive a load such as first generator 108 via shaft 106 for producing electricity.

ST system 104 includes a steam turbine 120 that is operably coupled to another generator 122 through shaft 124. ST system 104 may actually include one or more steam turbines, e.g., as shown, a high pressure (HP) turbine 126, an intermediate pressure (IP) turbine 128 and a low pressure (LP) turbine 130, each of which are coupled to shaft 124. Each steam turbine 126, 128, 130 includes a plurality of rotating blades (not shown in FIGS. 1-2) mechanically coupled to shaft 124.

CCPP 100 may also include a steam source 132, which may include a heat recovery steam generator (HRSG) 134 operably connected to GT system 102 and ST system 104. As understood, exhaust 136 from GT system 102 is used by HRSG 134 to create steam flow(s) 138 for use by ST system 104. HRSG 134 may include a conventional HRSG configuration, such as those used in conventional CCPPs, and/or may be embodied as another type of heat exchanger or similar component for using exhaust energy to produce steam. For example, HRSG 134 may include a thermally conductive pipe, line, etc., with water therein such that water in HRSG 134 is heated by exhaust 136 (FIG. 1) to produce steam flow(s) 138. HRSG 134 may be fluidly connected to both GT system 102 and ST system 104 via conventional piping (numbering omitted).

In operation, steam from steam source 132 (e.g., HRSG 134 and perhaps other sources), enters an inlet of HP turbine 126, IP turbine 128 and/or LP turbine 130, and is channeled to impart a force on blades thereof causing shaft 124 to rotate. As understood, steam from an upstream turbine may be employed later in a downstream turbine. The steam thus produced by steam source 132 drives at least a part of ST system 104 in which additional work is extracted to drive shaft 124 and an additional load such as second generator 122 which, in turn, produces additional electric power.

It is understood that generators 108, 122 and shafts 106, 124 may be of any size or type known in the art and may differ depending upon their application or the system to which they are connected. Common numbering of the generators and shafts is for clarity and does not necessarily suggest these generators or shafts are identical.

Figure 2:
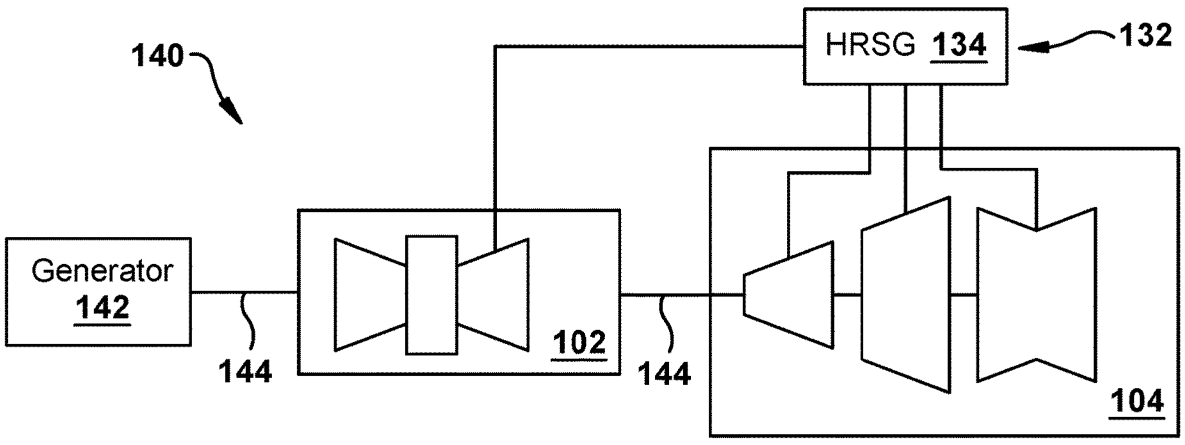
FIG. 2 shows a schematic view of another illustrative CCPP including a gas turbine and a steam turbine in which teachings of the disclosure can be applied.

In another embodiment, shown in FIG. 2, a single shaft CCPP 140 may include a single generator 142 coupled to GT system 102 and ST system 104 via a common shaft 144. Steam source 132, ST system 104 and/or GT system 102 may be similar to those described relative to FIG. 1. However embodied, CCPP 100 (FIG. 1), 140 (FIG. 2) incorporating GT system 102, steam source 132, and ST system 104 can include or interact with any now known or later developed control system (not shown) to provide automated control thereof.

Figure 3:
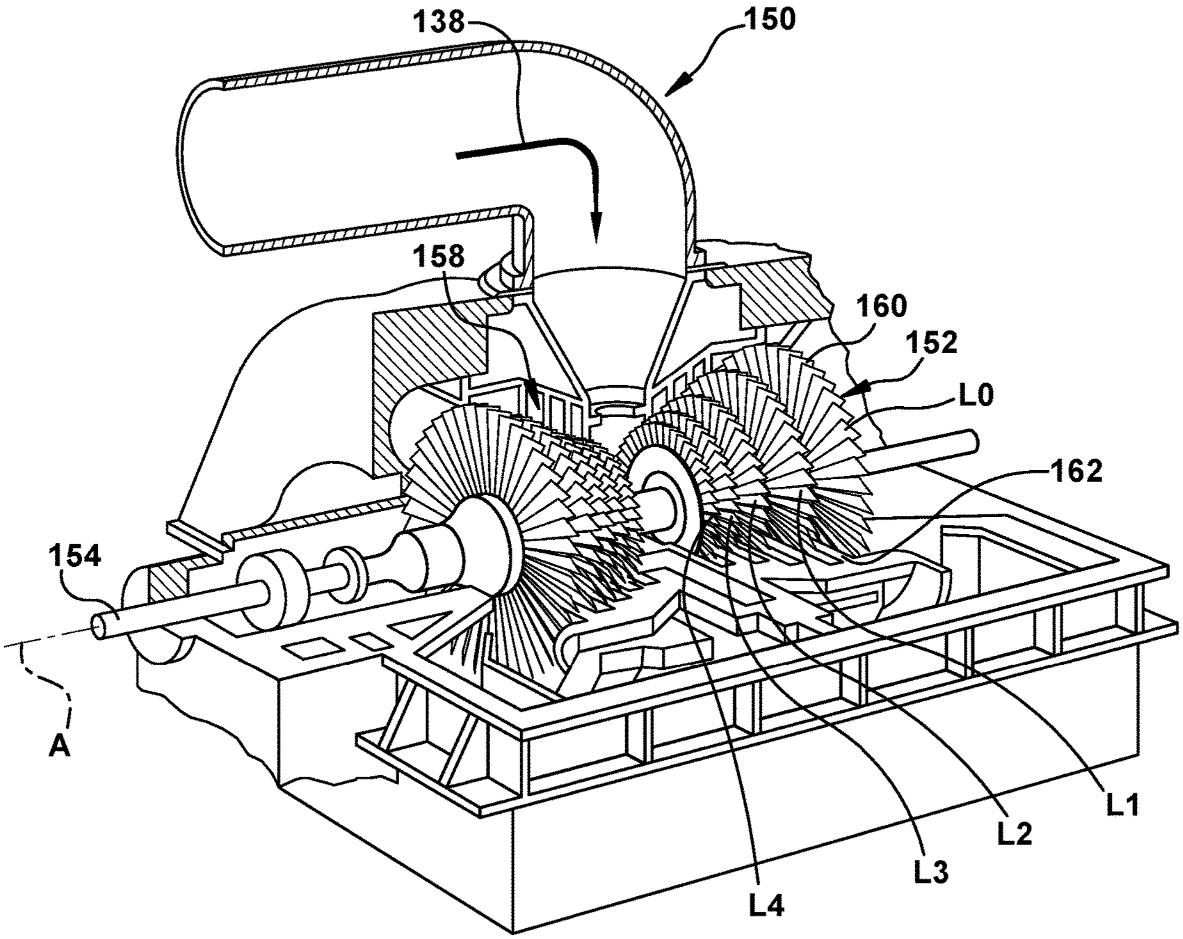
FIG. 3 shows a perspective view of an illustrative steam turbine system in which teachings of the disclosure can be applied.

FIG. 3 shows a perspective partial cut-away illustration of a steam turbine (ST) system 150, e.g., a low pressure ST system similar to system 130 in FIGS. 1 and 2. ST system 150 includes a rotor 152 that includes a rotating shaft 154 and a plurality of axially spaced rotor wheels 158. Rotor 152 has an axis A. A plurality of rotating blades 160 are mechanically coupled to each rotor wheel 158 of rotor 152. More specifically, blades 160 are arranged in rows that extend circumferentially around each rotor wheel 158. A plurality of stationary vanes 162 extends circumferentially around shaft 154, and the vanes are axially positioned between adjacent rows of blades 160. Stationary vanes 162 cooperate with blades 160 to form a stage and to define a portion of a steam flow path through ST system 150. In operation, steam flow 138 enters an inlet of ST system 150 and is channeled through stationary vanes 162. Vanes 162 direct steam flow 138 downstream against blades 160. Steam flow 138 passes through the remaining stages imparting a force on blades 160 causing shaft 154 to rotate. At least one end of ST system 150 may extend axially away from rotor 152 and may be attached to a load or machinery (not shown) such as, but not limited to, a generator 122 (FIG. 1), and/or another turbine system.

In one embodiment of the present disclosure as shown in FIG. 3, ST system 150 comprises five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine.

Figure 4A:
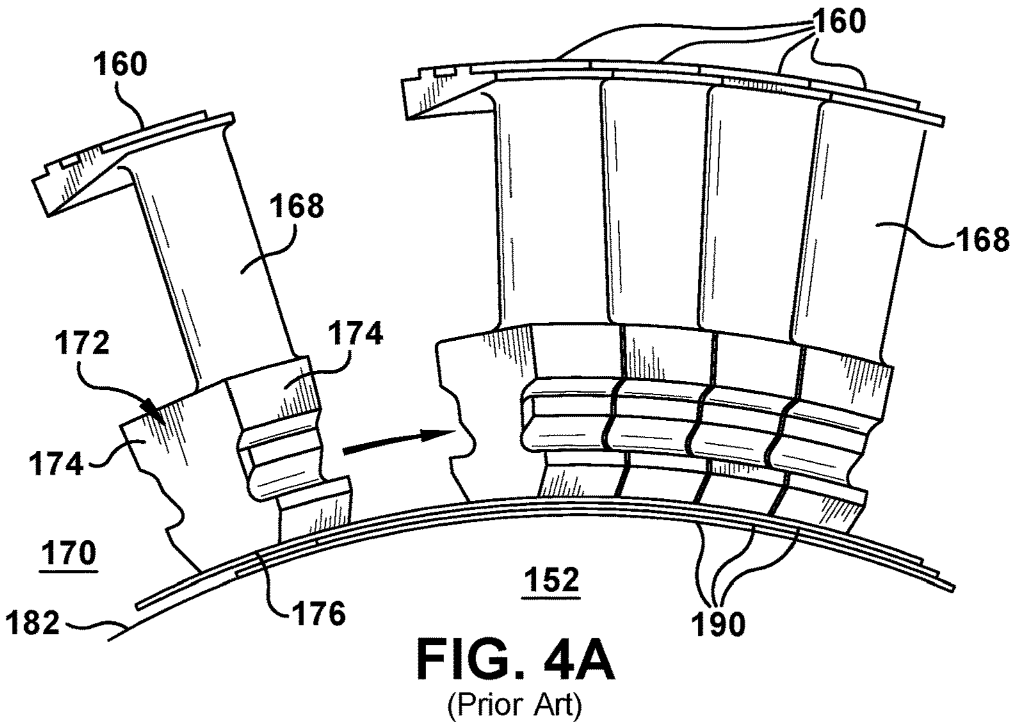
FIG. 4A (Prior Art)
FIG. 4A shows a schematic view of a conventional mounting of turbine blades using shims.
Figure 4B:
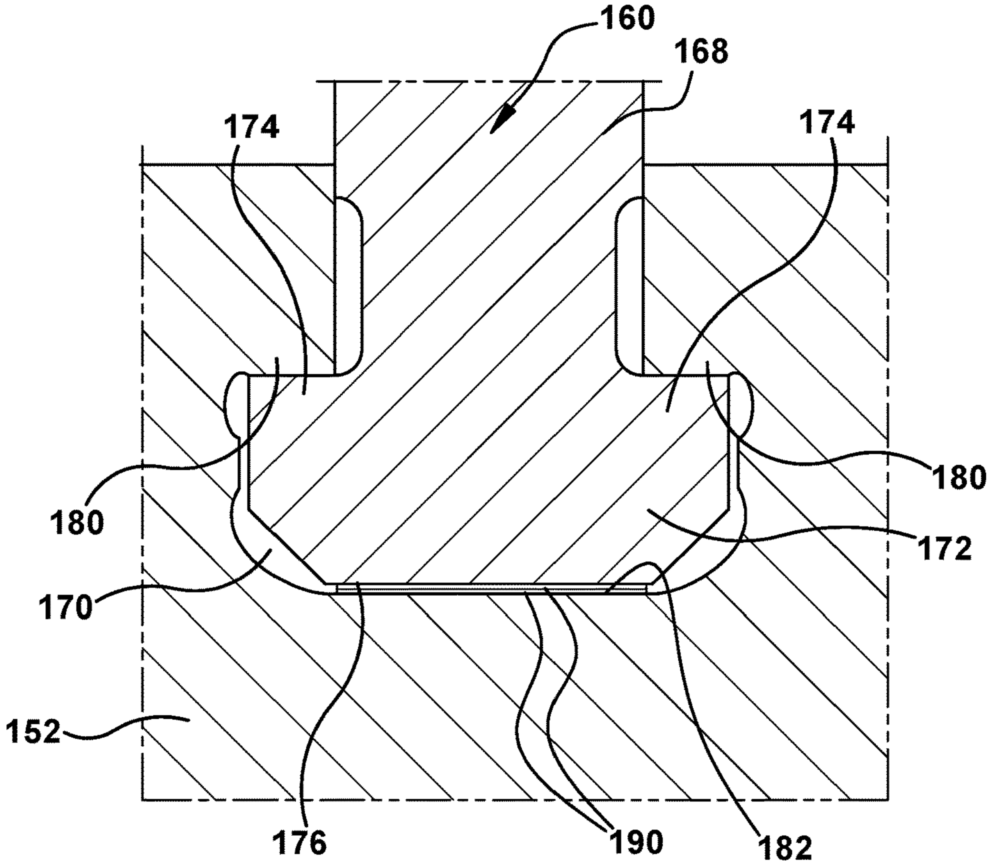
FIG. 4B (Prior Art)
FIG. 4B shows a cross-sectional view of a conventional mounting of turbine blades using shims.
Figure 5:
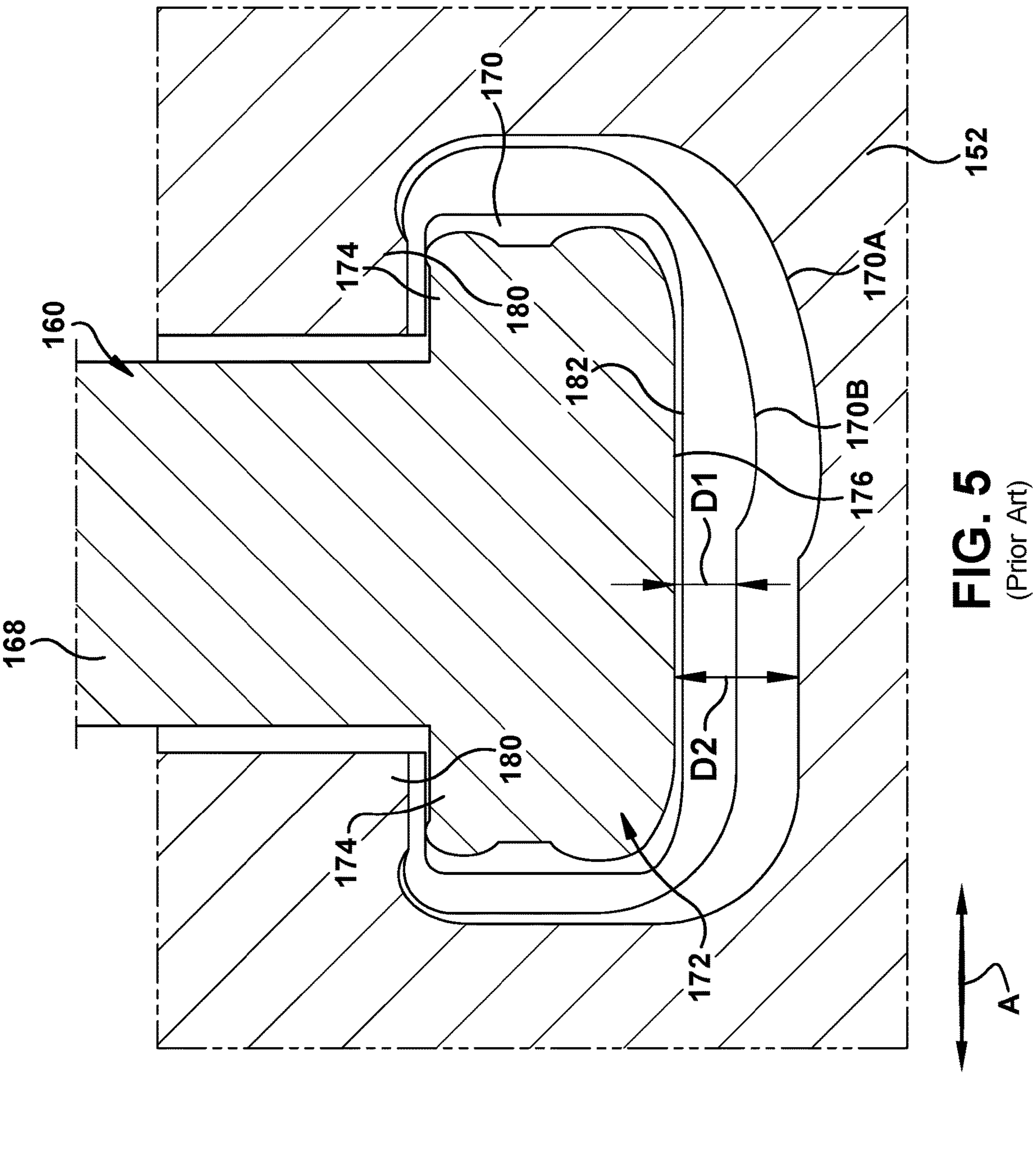
FIG. 5 (Prior Art)
FIG. 5 shows a schematic cross-sectional view of enlarging a rotor groove.

FIG. 4A shows a schematic view of a plurality of turbine blades 160 being mounted in a rotor groove (not shown) in rotor 152, FIG. 4B shows a cross-sectional view of a turbine blade 160 mounted relative to a rotor groove 170 in rotor 152, and FIG. 5 shows a cross-sectional view of a turbine blade 160 mounted relative to various rotor grooves 170 in rotor 152. As shown in FIGS. 4A-B and 5, turbine blades 160 include, among other structures, an airfoil 168 and a dovetail 172 coupled to airfoil 168. (Note, a dovetail may also be known as a root in the art.) Dovetail 172 may include a mounting arm 174 (two shown in FIGS. 4 and 5) and an end surface 176 facing radially inward relative to axis A of rotor 152. (Note, axis A actual location lower in pages of FIGS. 4 and 5 than shown). Rotor groove 170 includes a radially inward facing rotor hook 180 (two shown) and a radially outward facing surface 182, i.e., at bottom of groove 170 as shown. (Note, rotor hooks may also be referred to as lands or rotor wheels in the art). As recognized in the art, dovetail 172 and rotor groove 170 may include a variety of other mating surfaces (not shown) for retaining turbine blade 160 attached to rotor 152. For example, dovetails 172 for a GT system may have more surfaces, e.g., like a fir tree, to ensure secure mounting of turbine blade. In an initial setting, shown in FIG. 5, mounting arm(s) 174 of dovetail 172 engages radially inward facing rotor hook 180 of rotor groove 170 and radially inward facing end surface 176 engages a radially outward facing surface 182 of rotor groove 170. In this manner, dovetail 172 is sized to fit snugly in rotor groove 170 to retain turbine blade 160 to rotor 152. In other embodiments, shown in FIG. 4A-B, one or more planar plate shims 190 may be inserted between radially outward facing surface 182 of rotor groove 170 and radially inward facing end surface 176 of dovetail 172 to tightly position, i.e., pack, dovetail 172 in rotor groove 170. It will be recognized that GT systems employ similar mounting systems.

During use, rotor groove 170 may age and exhibit defects, e.g., indications, cracks, erosion or other deformities, that need to be removed during periodic servicing of the turbine system, e.g., ST system 150 (FIG. 3). During the servicing, turbine blades 160 are removed from rotor groove 170, and rotor groove 170 is machined to remove a portion thereof, resulting in an enlarged rotor groove compared to the original rotor groove 170. FIG. 5 shows two lines indicating extents to which an initial rotor groove 170 can be enlarged. Rotor groove 170A has been enlarged radially (generally up-down on page) by a first distance D1, and rotor groove 170B has been enlarged radially by a second distance D2 which is larger than distance D1. The amount of material removed may depend on a number of factors such as but not limited to the depth of the defects. In one non-limiting example, distance D1 may be 5 millimeters (mm), and distance D2 may be 10 mm. In any event, the new rotor groove 170A, 170B is larger than the initial dovetail 172, which typically can no longer be used to retain turbine blade 160 to rotor 152. While embodiments of the disclosure will be described relative to rotor grooves that have been enlarged during servicing of a turbine system, it is emphasized that the teachings of the disclosure are also applicable to new turbine systems in which the rotor groove is designed to be larger than a dovetail that needs to be mounted therein. This arrangement may be desired where a rotor needs a substantially larger rotor groove to reduce the groove stress concentration factor(s), but also needs a small dovetail to decrease the centrifugal stresses.

Figure 6:
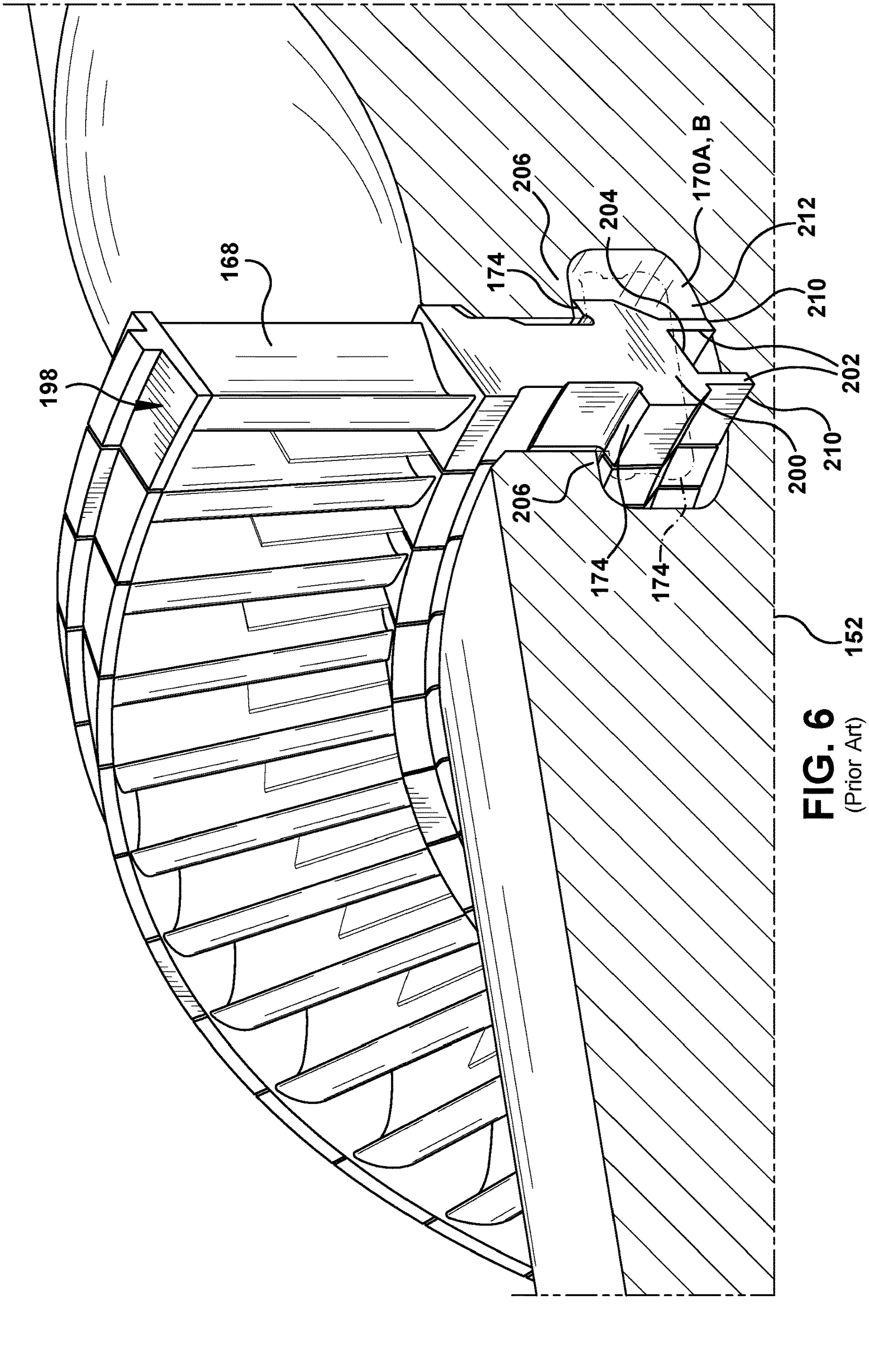
FIG. 6 (Prior Art)
FIG. 6 shows an end perspective view of mounting a conventional turbine blade including a dovetail with two positioning legs.

FIG. 6 shows a perspective view of one approach to provide a tight-fitting dovetail 200 within enlarged rotor grooves 170A or 170B. In FIG. 6, a new turbine blade 198 includes a dovetail 200 having a pair of positioning legs 202 extending from radially inward facing end surface 204 thereof. Legs 202 can be sized to ensure mounting arm(s) 174 of dovetail 200 engages radially inward facing rotor hook 206 of new rotor groove 170A or 170B and radially inward facing ends 210 of legs 202 engages a radially outward facing surface 212 of rotor groove 170A or 170B in a tight fashion. Plate shims, as in FIGS. 4A-B, can also be used with this arrangement. While this approach provides a tight-fitting arrangement, legs 202 are integrally formed as part of dovetail 200 (i.e., they are the same integral material) and create additional weight that can increase centrifugal forces and stresses.

Figure 7:
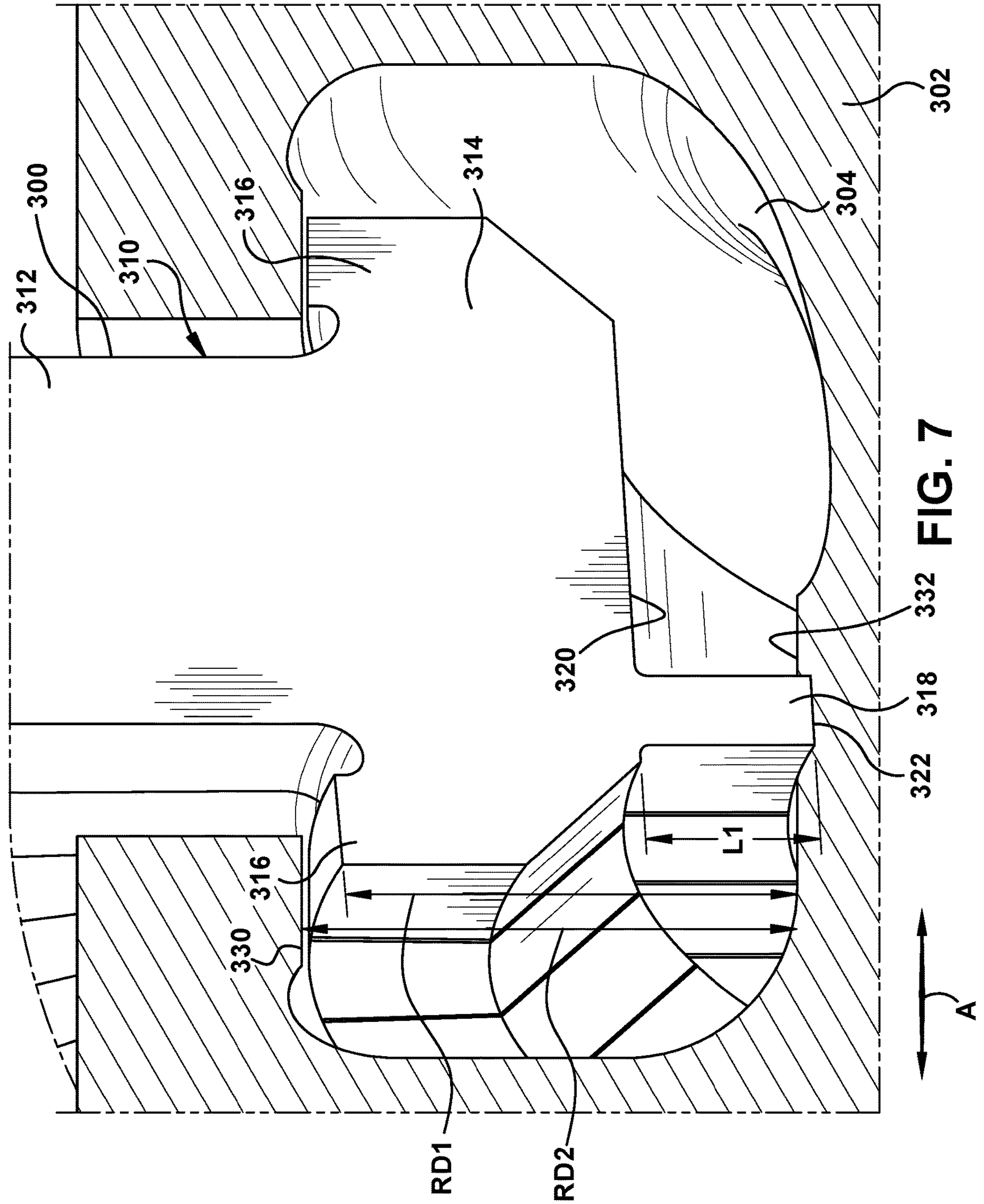
FIG. 7 shows an enlarged, end perspective view of mounting a turbine blade including a single positioning leg, according to embodiments of the disclosure.
Figure 8:
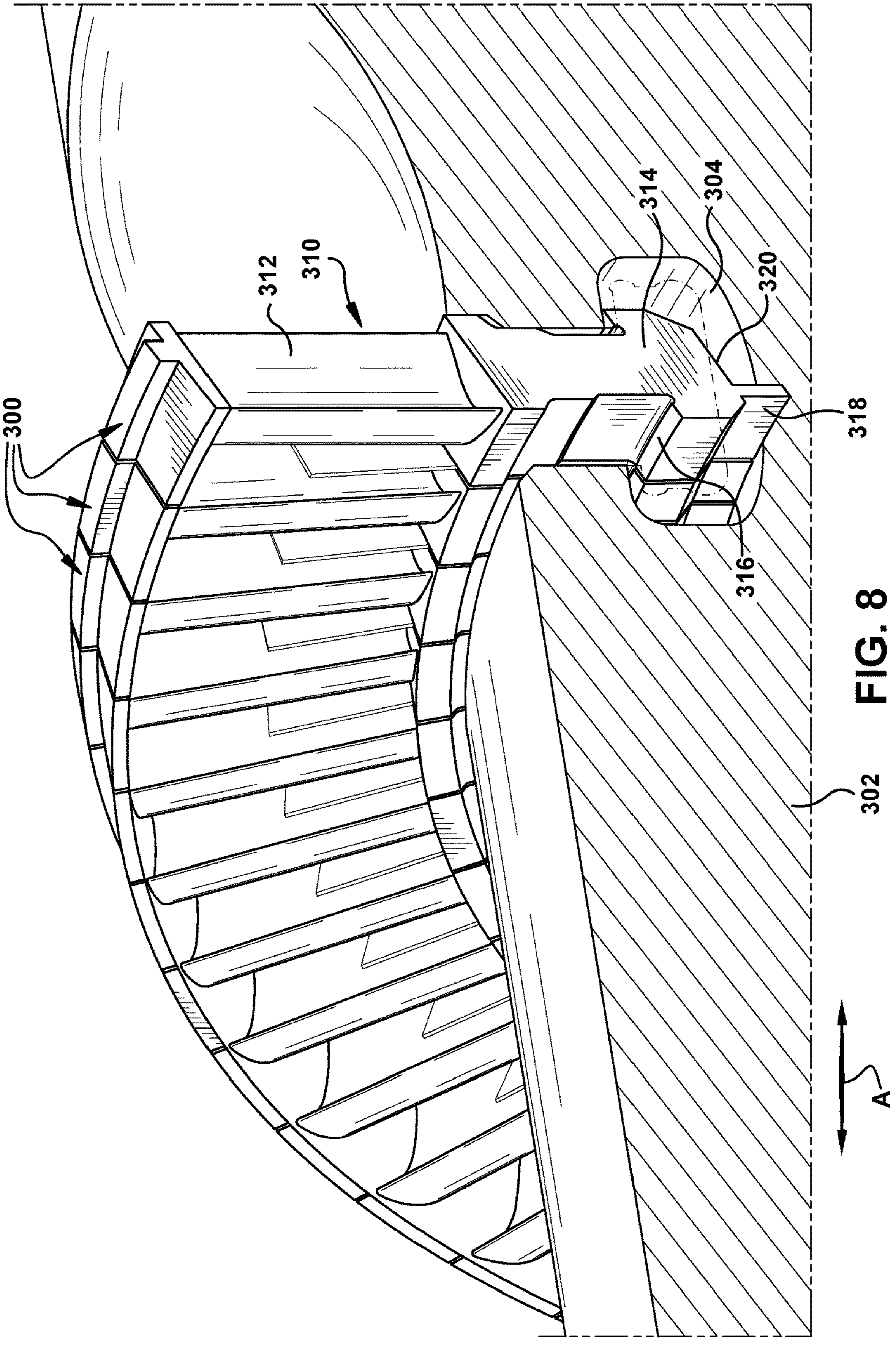
FIG. 8 shows an end perspective view of mounting turbine blades, each including a single positioning leg, according to embodiments of the disclosure.

FIG. 7 shows an enlarged perspective view a turbine blade 300, and FIG. 8 shows a perspective view of multiple turbine blades 300 being installed in a rotor 302, according to embodiments of the disclosure. Turbine blade 310 includes an airfoil 312 and a dovetail 314 coupled to airfoil 312. Dovetail 314 includes a mounting arm 316 (two shown) and a single positioning leg 318 extending radially inward relative to axis A from a radially inward facing end surface 320 of dovetail 314. Dovetail 314 including mounting arm 316 and single positioning leg 318 are integrally formed of a single material. As shown in FIG. 7, a radial distance RD1 between mounting arm 316 and a radially inner end 322 of single positioning leg 318 matches a radial distance RD2 between a radially inward facing rotor hook 330 and a radially outward facing surface 332 of rotor groove 304. Thus, turbine blade 300 provides a tight-fitting dovetail 314 within enlarged rotor groove 304 with less weight than turbine blade 198 (FIG. 6). Single positioning leg 318 can be at any axial location on radially inward facing end surface 320 of dovetail 314. Single positioning leg 318 can have a consistent length L1, i.e., between radially inward facing end surface 320 of dovetail 314 and a radially inner end 322 thereof. In other embodiments, length L2 may vary circumferentially, i.e., into or out of page of FIGS. 7, to accommodate uneven radially outward facing surface 332 of rotor groove 304. Turbine blade 300 can be formed using any now known or later developed technology such as but not limited to casting and additive manufacture.

A method of mounting turbine blade 300 may include providing rotor groove 304 defined in rotor 302 having axis A. Rotor groove 304 includes radially inward facing rotor hook 330 and radially outward facing surface 332. As noted, in certain embodiments, providing rotor groove 304 may include machining rotor groove 304 to enlarge radial distance RD2 between radially inward facing rotor hook 330 and radially outward facing surface 332 of rotor groove 304, e.g., to remove aged or damaged surfaces thereof from prior use. Turbine blade 310 includes dovetail 314 having mounting arm 316 and single positioning leg 318 extending from radially inward facing end surface 320 of dovetail 314. Turbine blade 300 with single positioning leg 318 can be formed to have radial distance RD1 between mounting arm 316 and radially inner end 322 of single positioning leg 318 match second radial distance RD2 between radially inward facing rotor hook 330 and a radially outward facing surface 332 of rotor groove 304. Alternatively, single positioning leg 318 may be adjusted, e.g., machined, to have radial distance RD1 between mounting arm 316 and radially inner end 322 of single positioning leg 318 match second radial distance RD2 between radially inward facing rotor hook 330 and a radially outward facing surface 332 of rotor groove 304. For example, any machining can be performed to remove material from radial inner end 322 of single positioning leg 318 to adjust its length.

Figure 9:
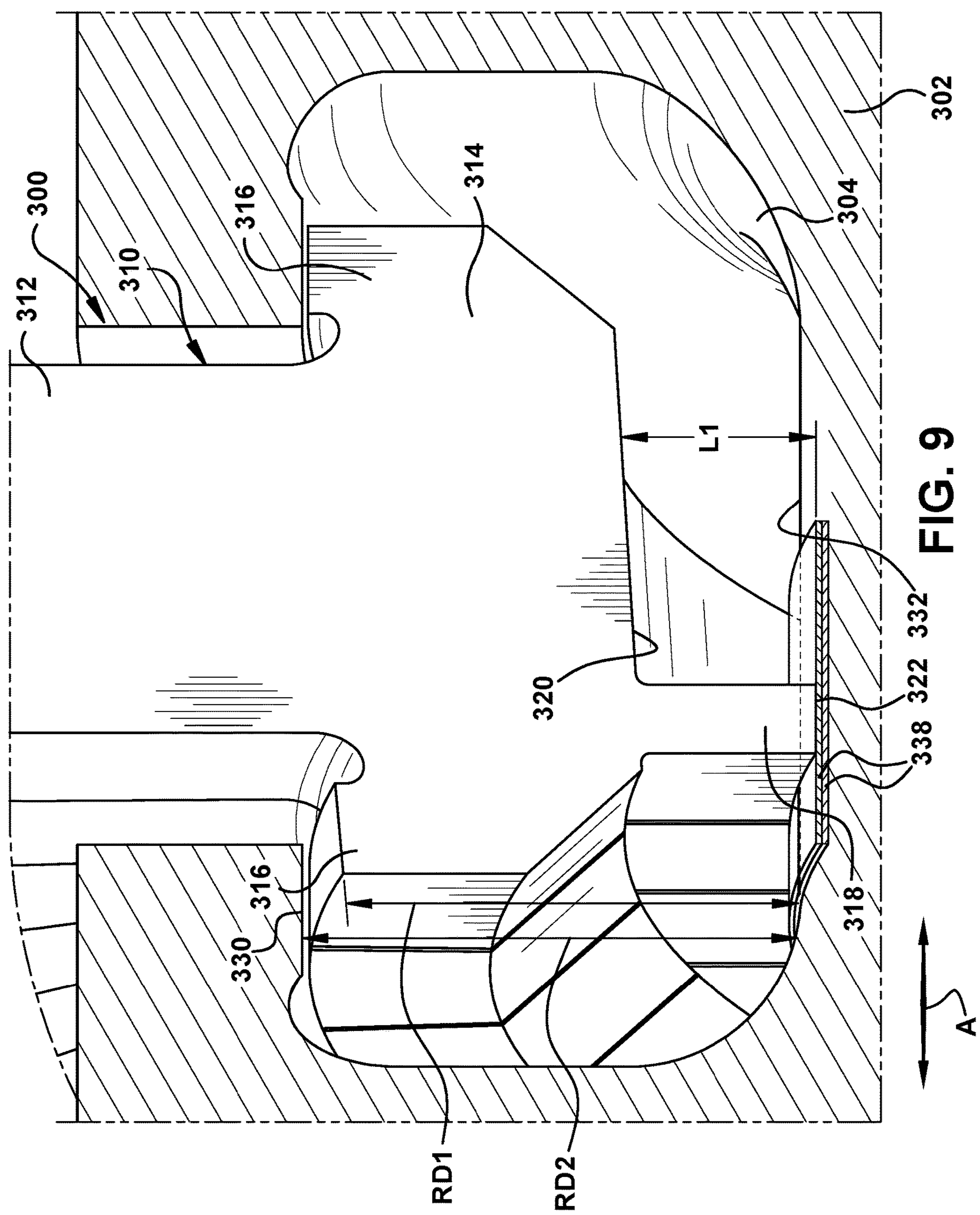
FIG. 9 shows an enlarged, end perspective view of mounting a turbine blade including a single positioning leg and using shim(s), according to embodiments of the disclosure.

FIG. 8 shows mounting dovetail 314 of turbine blade 300 in rotor groove 304. Dovetail 314 may be mounted in rotor groove 304 in any now known or later developed fashion, typically by sliding insertion of dovetail 314 into an open end of rotor groove 304. Dovetail 314 may be slid circumferentially along rotor groove 340 until it abuts a dovetail 314 of an adjacent turbine blade 300. Note, in some cases, radially extending shims (not shown) may be placed between dovetails of adjacent turbine blades 300 for proper circumferential positioning. In certain cases, adjusting single positioning leg 318 may include adjusting it such that radial distance RD1 between mounting arm 316 and radially inner end 322 of single positioning leg 318 is less than radial distance RD2 between radially inward facing rotor hook 330 and radially outward facing surface 332 of rotor groove 304. In this case, as shown in FIG. 9, the mounting may further include positioning at least one planar plate shim 338 between single positioning leg 318 and radially outward facing surface 332 of rotor groove 304. Any number of planar plate shims 338 can be provided to create a tight-fitting dovetail 314 and rotor groove 304 connection.

One challenge with the FIGS. 7-9 embodiments is that the size of rotor groove 304 must be generally known in order for each turbine blade 300 to be manufactured with single positioning leg 318 and correctly sized for use. However, during servicing of a turbine system, the required amount of enlargement of rotor grooves 304 may not be known in a manner that leaves sufficient lead time for manufacture of turbine blades 300 with single positioning leg 318. Further, the amount of enlargement may vary based on stage and/or along a particular rotor groove 304, generating another set of unknowns. Delays in manufacturing properly sized turbine blades 300 can delay completion of the servicing of a turbine system, which can be very expensive.

Referring to FIGS. 10-21, in another embodiment, a turbine blade assembly 400 (hereafter "assembly 400") employs a turbine blade 402 having a dovetail 404 with a separate extension insert 406. Extension insert 406 is not integrally formed with dovetail 404. Assembly 400 with turbine blade 402 having dovetail 404 with a separate extension insert 406 segments a radial inner end of dovetail 404 in a manner to address the above-noted challenges. For example, turbine blade assembly 400 allows for manufacture and provisioning of turbine blades 402 for servicing that may have long lead times, but provide extension inserts 406 that can be manufactured and provisioned in less time and are highly customizable to provide tight-fitting dovetail-rotor groove arrangements for all turbine blades in a turbine system.

Figure 10:
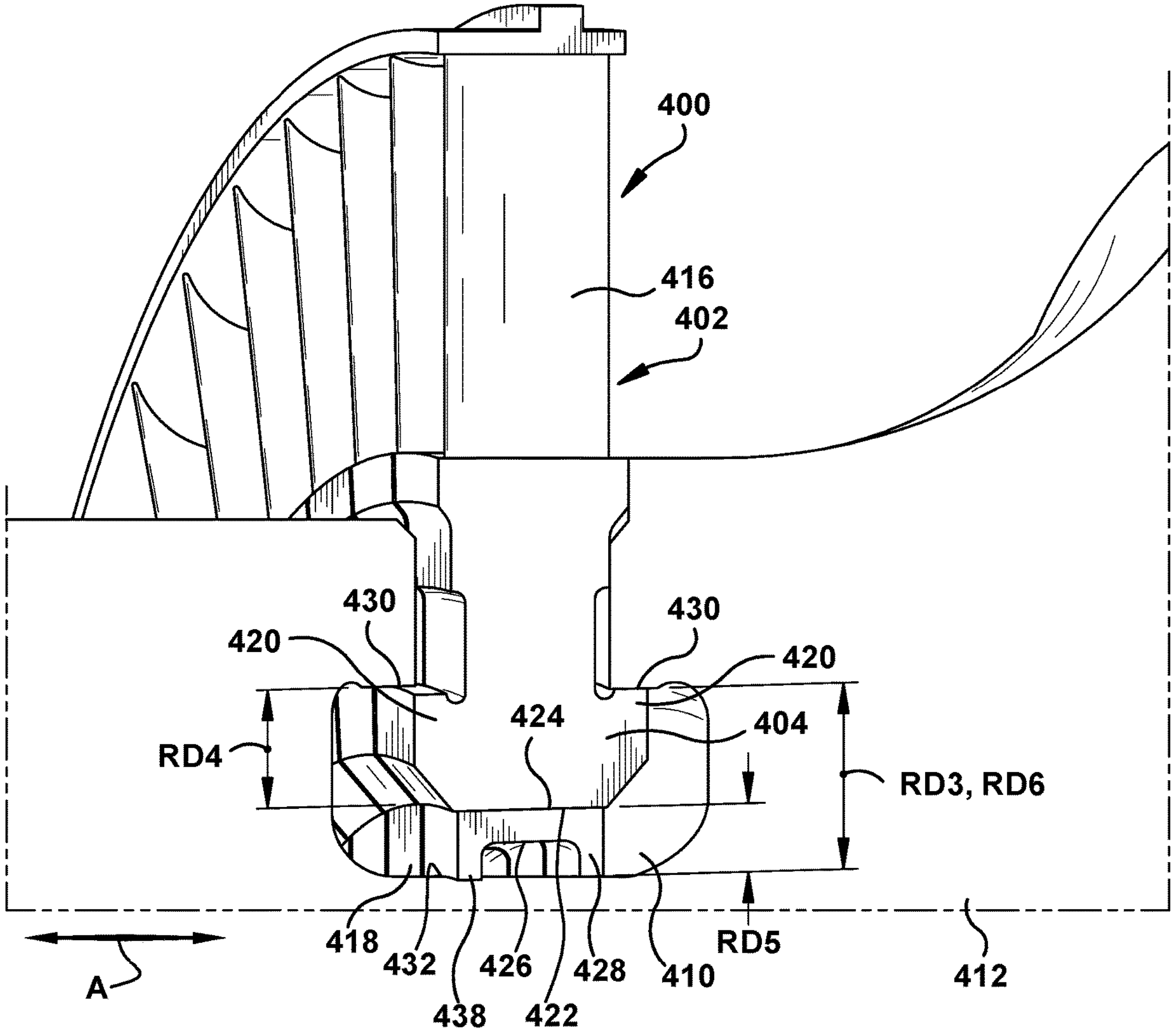
FIG. 10 shows an end perspective view of mounting a turbine blade assembly including a turbine blade with a dovetail and an extension insert including positioning leg(s) thereon, according to embodiments of the disclosure.
Figure 11:
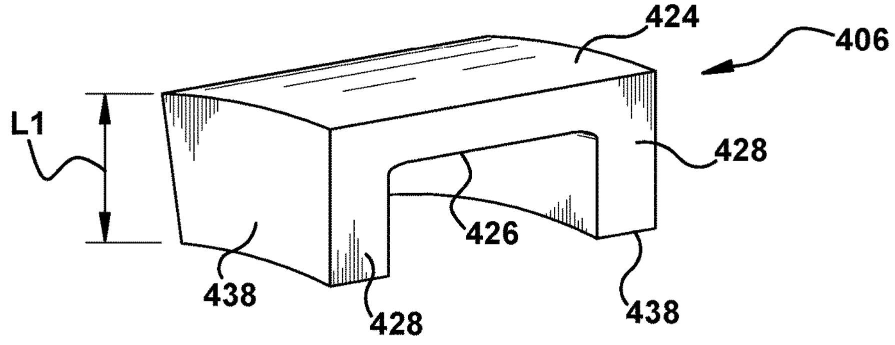
FIG. 11 shows a perspective view of an extension insert including positioning leg(s), according to embodiments of the disclosure.
Figure 12:
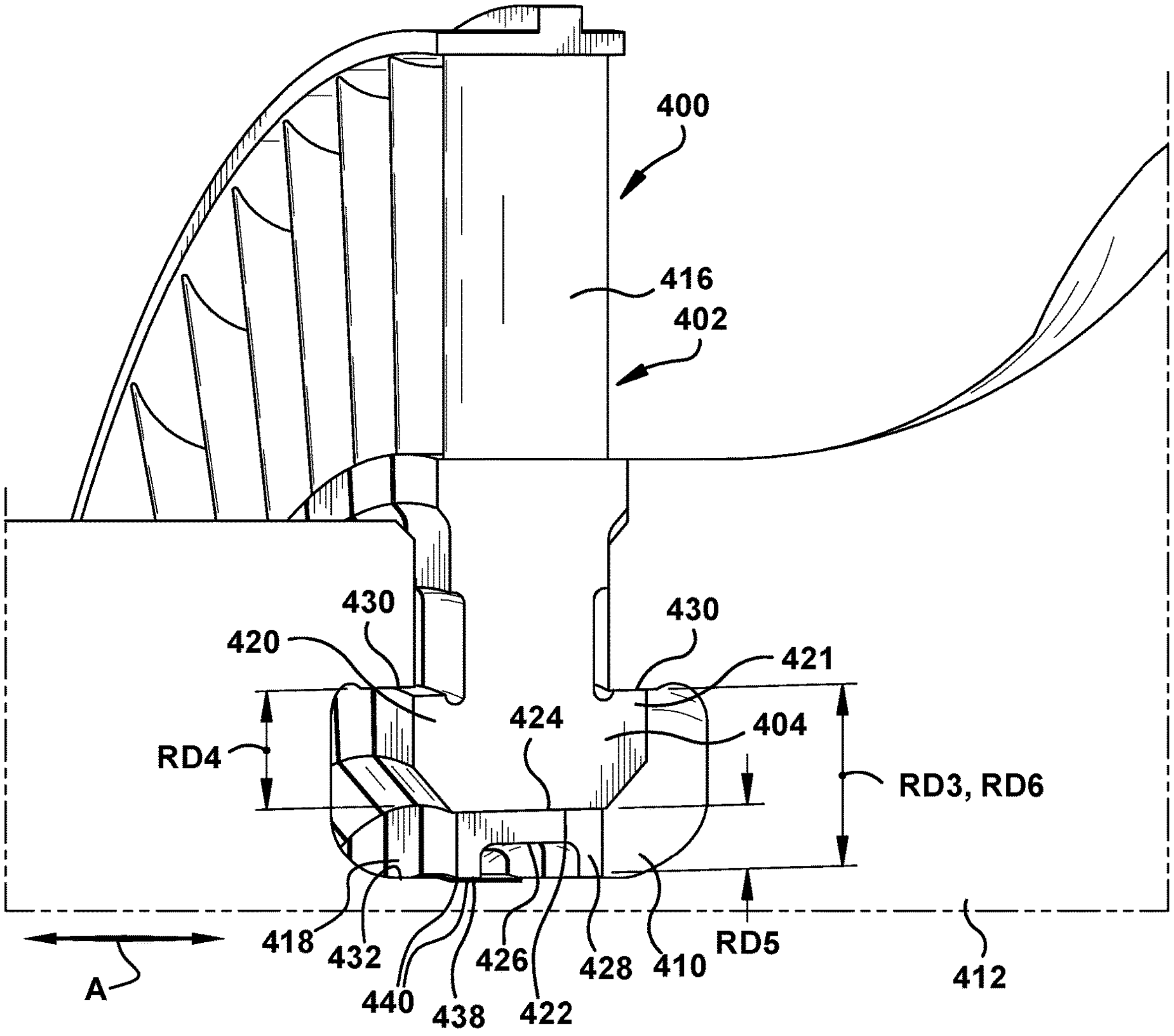
FIG. 12 shows an end perspective view of mounting a turbine blade assembly including a turbine blade with a dovetail and an extension insert including two positioning legs and using shim(s) under both legs, according to embodiments of the disclosure.
Figure 13:
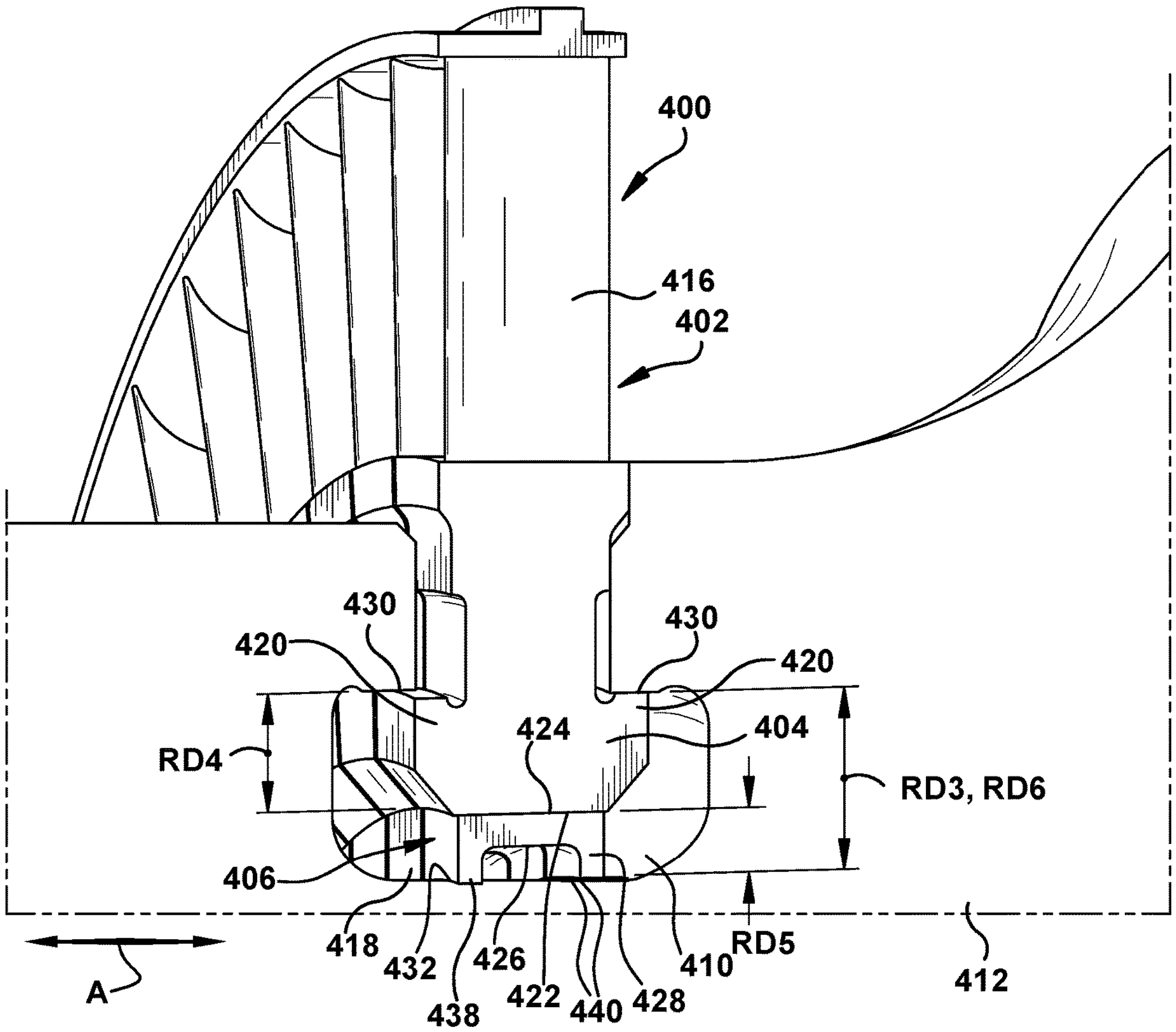
FIG. 13 shows an end perspective view of mounting a turbine blade assembly including a turbine blade with a dovetail and an extension insert including two positioning legs and using shim(s) under only one leg, according to embodiments of the disclosure.

FIGS. 10, 12 and 13 show end views of a turbine blade assembly 400, and FIG. 11 shows a perspective view of an extension insert 406, according to embodiments of the disclosure. As shown in FIGS. 10, 12 and 13, assembly 400 is configured for an enlarged rotor groove 410 defined in a rotor 412 having an axis A (similar to rotor grooves 170A, 170B in FIG. 5). Assembly 400 may include turbine blade 402 including an airfoil 416 and dovetail 404 coupled to airfoil 416. Dovetail 404 includes a mounting arm 420 and an end surface 422 facing radially inward relative to axis A. In these embodiments, end surface 422 of dovetail 404 is free of positioning legs and does not extend to contact radially outward end surface 432 of rotor groove 410. Rather, as shown in FIGS. 10-13, assembly 400 includes a separate extension insert 406 including a first end 424 configured to contact end surface 422 of dovetail 404 and a second end 426. Second end 426 includes at least one positioning leg 428 extending radially inward relative to the axis A. As shown in FIGS. 10-13, dovetail 404 and extension insert 406 are configured to be positioned in rotor groove 410 to mount turbine blade 402 to rotor 412. Mounting arm 420 engages a radially inward facing rotor hook 430 of rotor groove 410, and extension insert 406 may fill a radial space between end surface 422 of dovetail 404 and radially outward facing surface 432 of rotor groove 410.

As shown in FIG. 10, in certain embodiments, all positioning leg(s) 428 provided may engage radially outward facing surface 432 of rotor groove 410. In this embodiment, positioning leg(s) 428 are manufactured to create a tight fit with dovetail 404 in rotor groove 410, or are adjusted, e.g., machined to remove material, to create a tight fit with dovetail 404 in rotor groove 410. As shown in FIG. 12, in other embodiments, all positioning leg(s) 428 may engage one or more planar plate shims 440 between positioning leg(s) 428 and radially outward facing surface 432 of rotor groove 410. That is, all of positioning leg(s) 428 are slightly too short to create a tight fit with dovetail 404 in rotor groove 410, and one or more planar plate shims 440 provide the tight fit with dovetail 404 and insert 406 in rotor groove 410. Hence, assembly 400 may include at least one planar plate shim 440 between positioning leg(s) 428 and radially outward facing surface 432 of rotor groove 410. Alternatively, as shown in FIG. 13, certain embodiments may combine positioning leg(s) 428 manufactured to create a tight fit with dovetail 404 in rotor groove 410 (with or without adjustment) with those requiring planar plate shim(s) 440. Hence, mounting arm 420 engages radially inward facing rotor hook 430 of rotor groove 410 and positioning leg(s) 428 may engage radially outward facing surface 432 of rotor groove 410 or planar plate shim(s) 440 between positioning leg(s) 428 and radially outward facing surface 432 of rotor groove 410.

Figure 20:
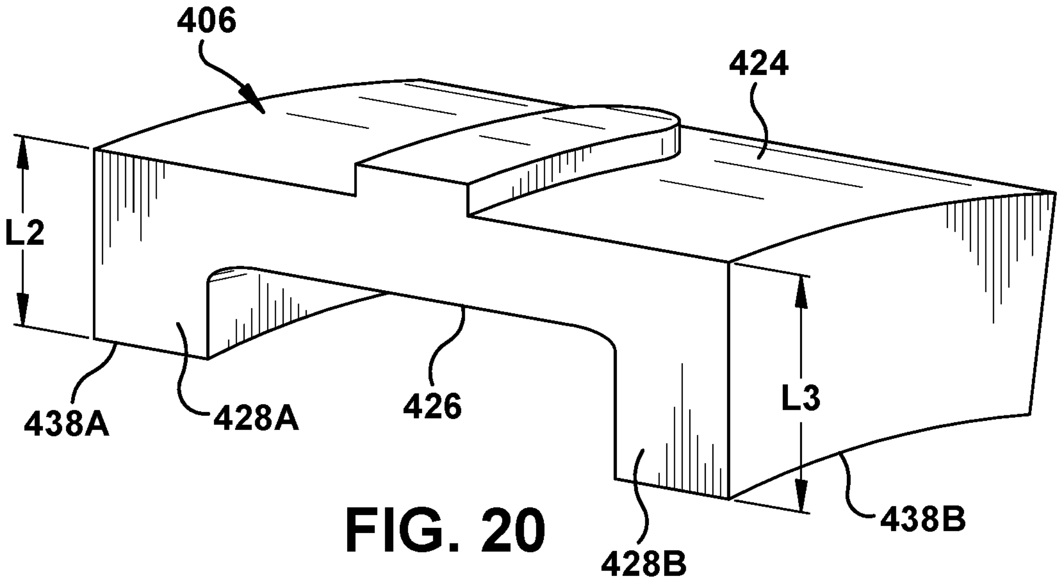
FIG. 20 shows a perspective view of an extension insert including positioning legs having different lengths, according to embodiments of the disclosure.
Figure 21:
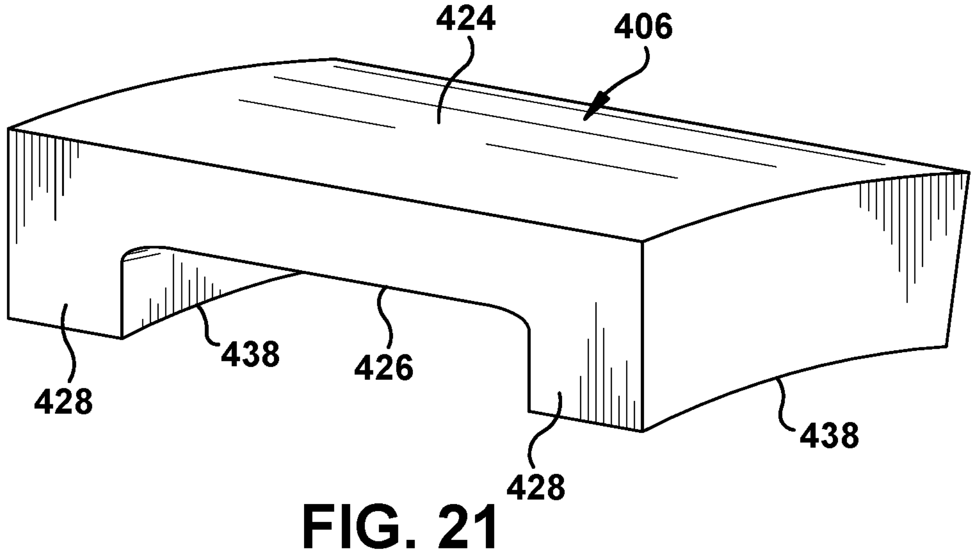
FIG. 21 shows a perspective view of an extension insert including a positioning leg with different lengths along a circumferential extent thereof, according to embodiments of the disclosure.

Extension inserts 406 are highly customizable to address different radial distances between rotor hooks 430 and radially outward surface 432. Extension insert 406 can address a situation where the radial distance is consistent for a given rotor groove 410. In another example, extension inserts 406 can address inconsistency in the radial distance within a given rotor groove 410 in an axial direction by having two or more positioning legs 428 thereof have different lengths. FIG. 20 shows extension insert 406 including positioning legs 428A and 428B with different lengths L2, L3 from first end 424 to respective radial inner ends 438A, 438B thereof. That is, where plurality of positioning legs 428 are used, at least two of the plurality of positioning legs may have different lengths, e.g., leg 428A has length L2 and leg 428B has length L3 measured from first end 424 to a radially inward end of each leg. In yet another example, extension inserts 406 can address inconsistency in the radial distance within a given rotor groove 410 in a circumferential direction, i.e., into and out of page of FIGS. 10, 12 and 13. For example, positioning leg(s) 428 on a selected insert 406 may have radial extents that vary in a circumferential direction to accommodate different radial distances where the selected insert 406 is located. FIG. 21, for example, shows a curvature in radial inner end 438 of a positioning leg 428. In addition or alternatively thereto, circumferentially adjacent extension inserts 406 may have positioning leg(s) 428 having different radial lengths to address different radial distances where each insert is located. In any case, positioning leg(s) 428 can be located anywhere axially on extension insert 406, i.e., along axis A.

Figure 14:
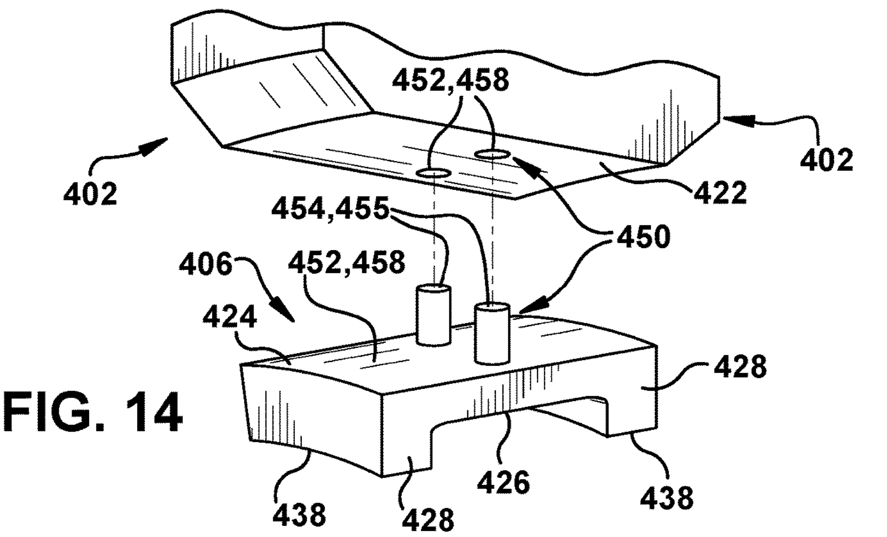
FIG. 14 shows an exploded perspective view of a turbine blade with a dovetail and an extension insert including positioning legs and a fixation element, according to embodiments of the disclosure.
Figure 15:
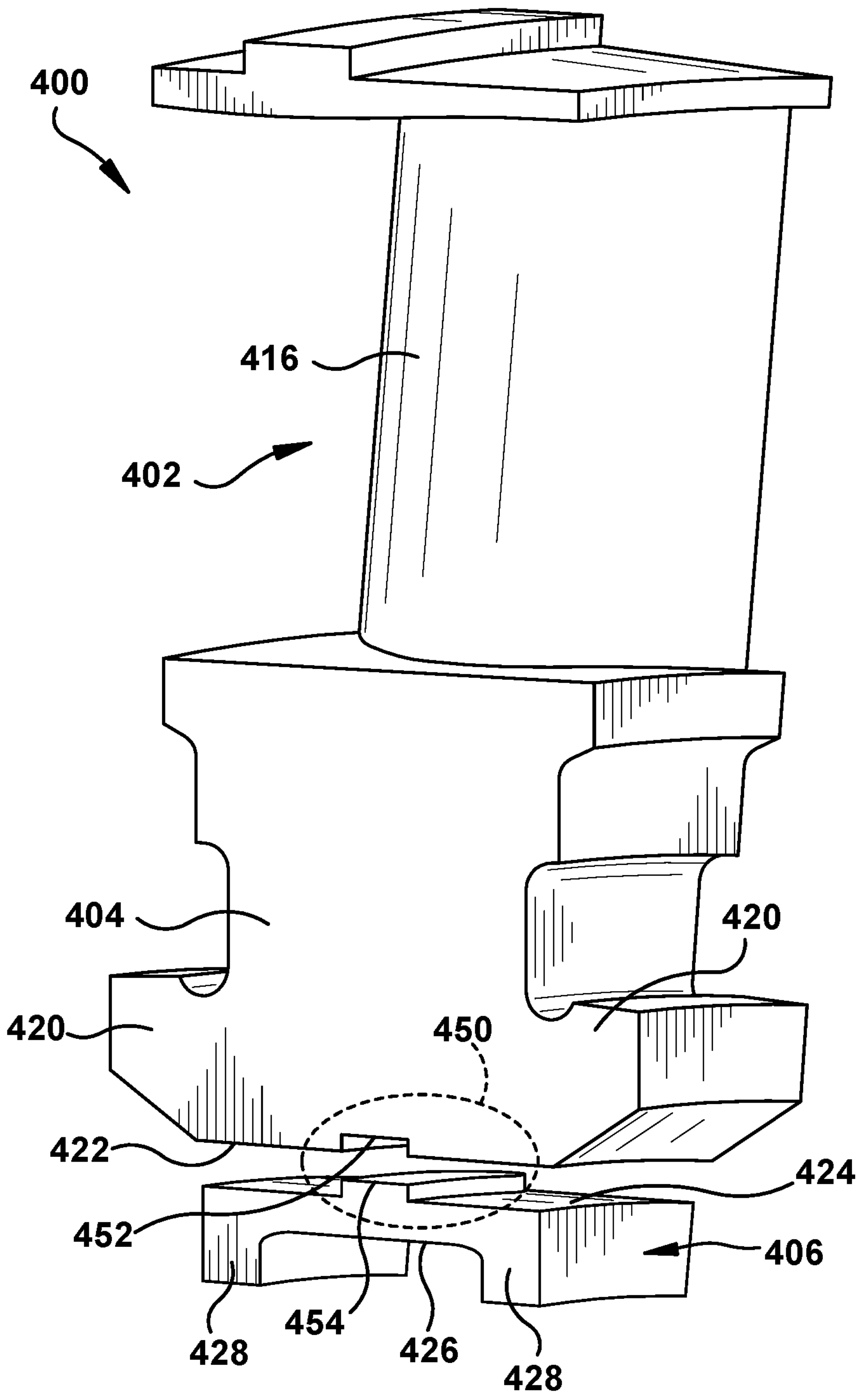
FIG. 15 shows an exploded perspective view of a turbine blade with a dovetail and an extension insert including positioning legs and a fixation element, according to other embodiments of the disclosure.
Figure 16:
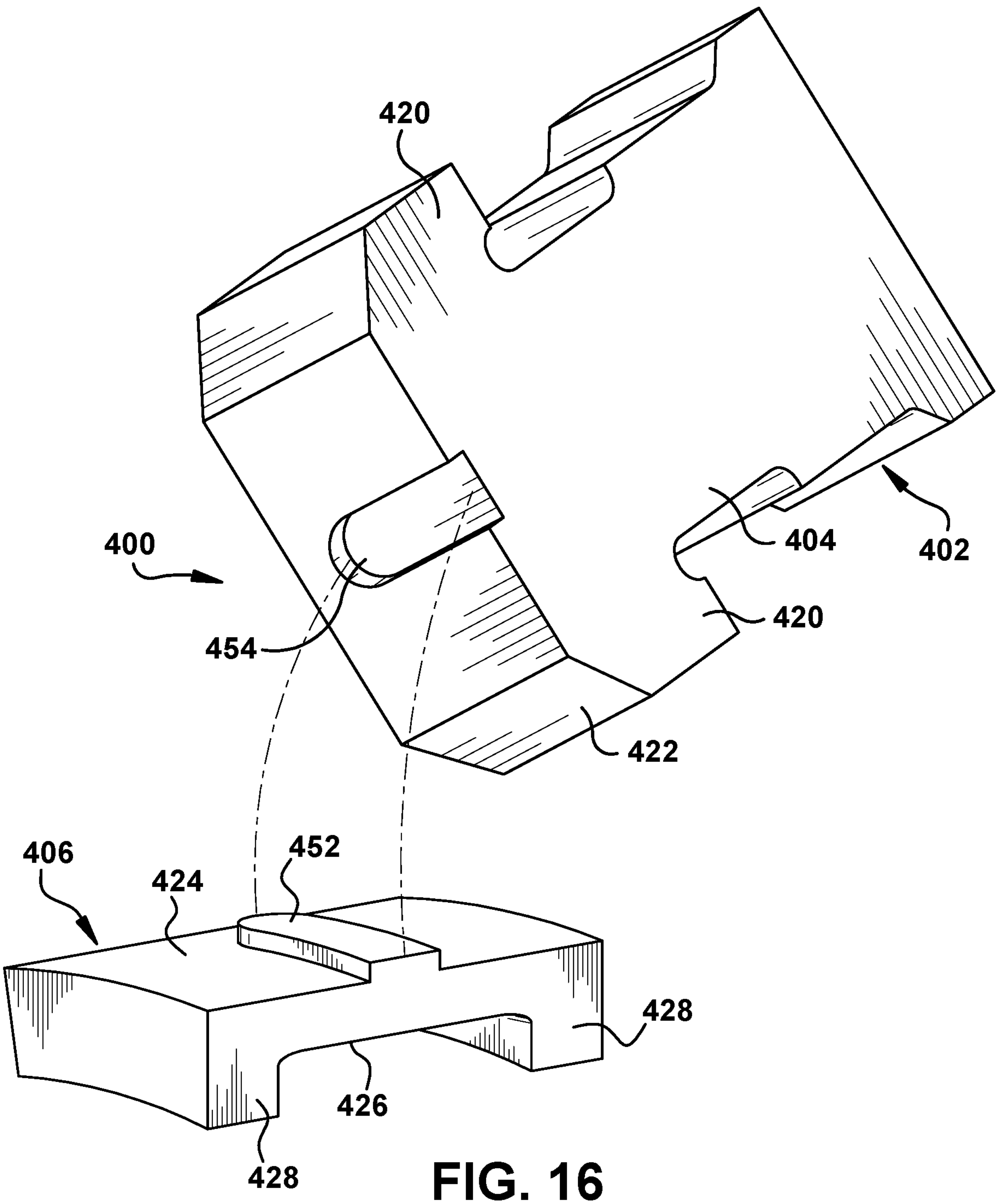
FIG. 16 shows an exploded perspective view of a turbine blade with a dovetail and an extension insert including positioning legs and a fixation element, according to additional embodiments of the disclosure.

Assembly 400 may also optionally include a fixation element 450 locking a position of extension insert 406 relative to dovetail 404 of turbine blade 402, e.g., both circumferentially and axially within rotor groove 410. Fixation element 450 can take a variety of forms. In one example, shown in FIGS. 14-16, fixation element 450 includes a male-female coupler 450. In certain embodiments, a female portion 452 of male-female coupler 450 is defined in end surface 422 of dovetail 404, and a male portion 454 of male-female coupler 450 extends from first end 424 of extension insert 406 and is configured to seat within female portion 452 in end surface 422 to lock a position of extension insert 406 relative to dovetail 404 of turbine blade 402. In FIG. 14, male-female coupler 450 may include two or more pegs 455 configured to mate in corresponding holes 458 in end surface 422. In FIGS. 15 and 16, male-female coupler 450 may include a male portion 454 in the form of a tongue element configured to mate in corresponding female portion 452 in the form of a groove or slot in end surface 422. It will be recognized that a large variety of alternative male-female couplers 450 are possible and considered within the scope of the disclosure.

Figure 17:
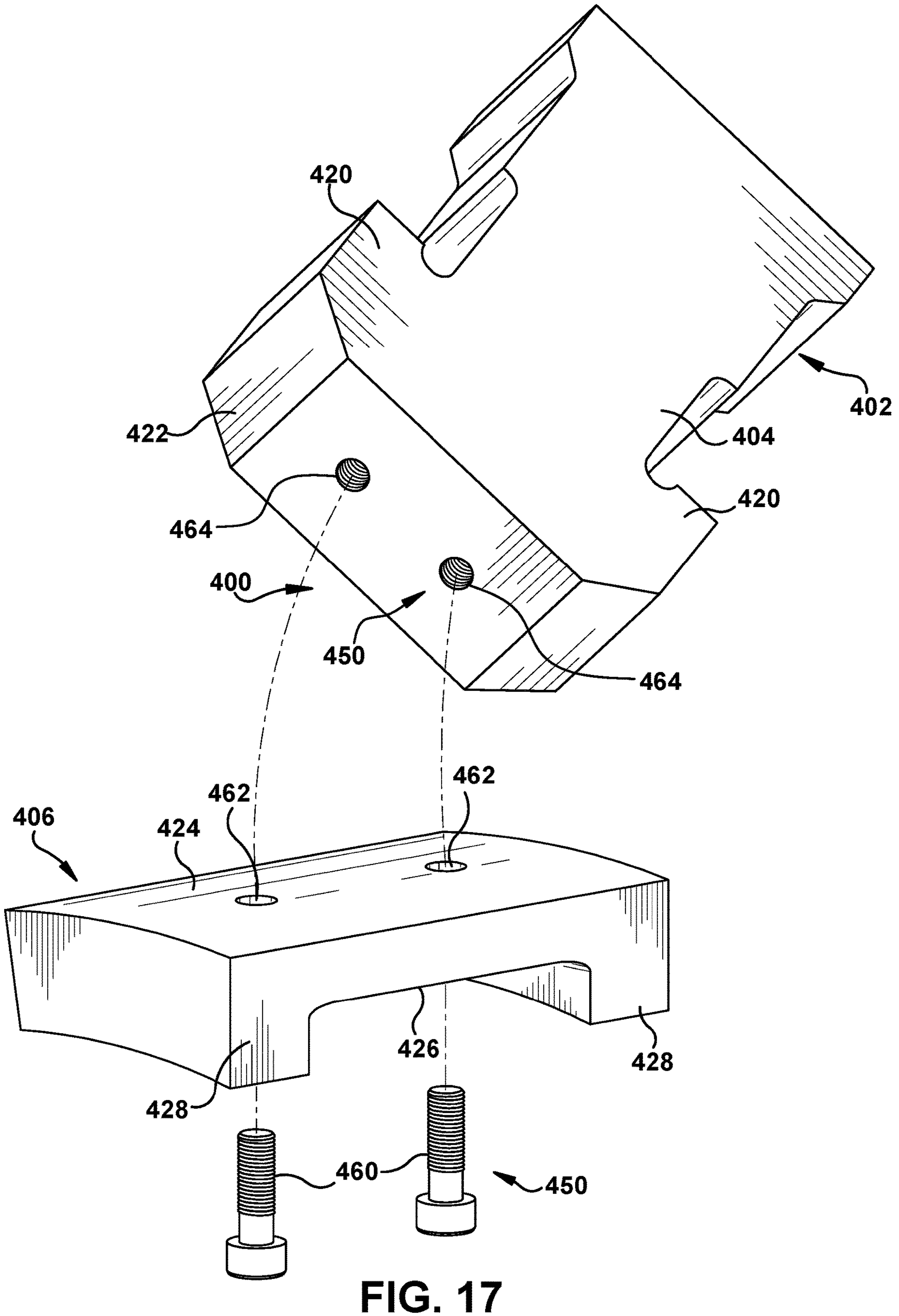
FIG. 17 shows an exploded perspective view of a turbine blade with a dovetail and an extension insert including positioning legs and a fixation element, according to other embodiments of the disclosure.

In another embodiment, shown in FIG. 17, fixation element 450 may include one or more fasteners 460 coupling end surface 422 of dovetail 404 and first end 424 of extension insert 406 together. Fasteners 456 may take any form and may mate with extend through corresponding openings 462 in extension insert 460 and mate in holes 464 in end surface 422 of dovetail 404. In the example shown, fasteners 456 include threaded fasteners such as bolts or screws. Other forms of fasteners 456 are also possible.

Extension insert 406 has a radial extent between first end 424 and second end 426 (and excluding any fixation element 450) of larger than 4 millimeters. In contrast, where provided, each planar plate shim 440 may have a radial extent of no greater than 1.5 millimeter.

Figure 18:
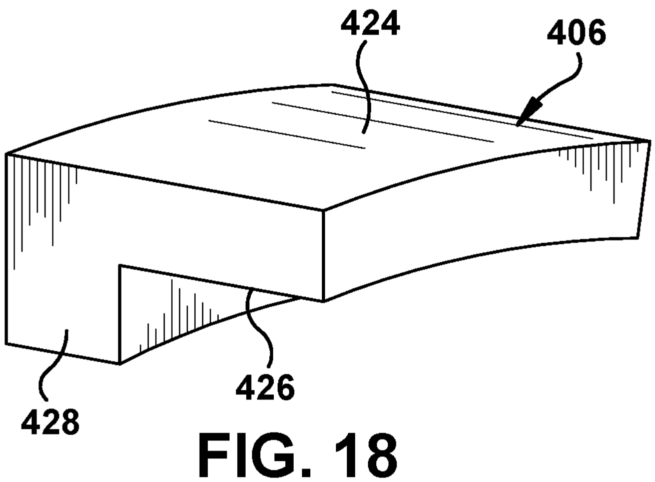
FIG. 18 shows a perspective view of an extension insert including a single positioning leg, according to embodiments of the disclosure.
Figure 19:
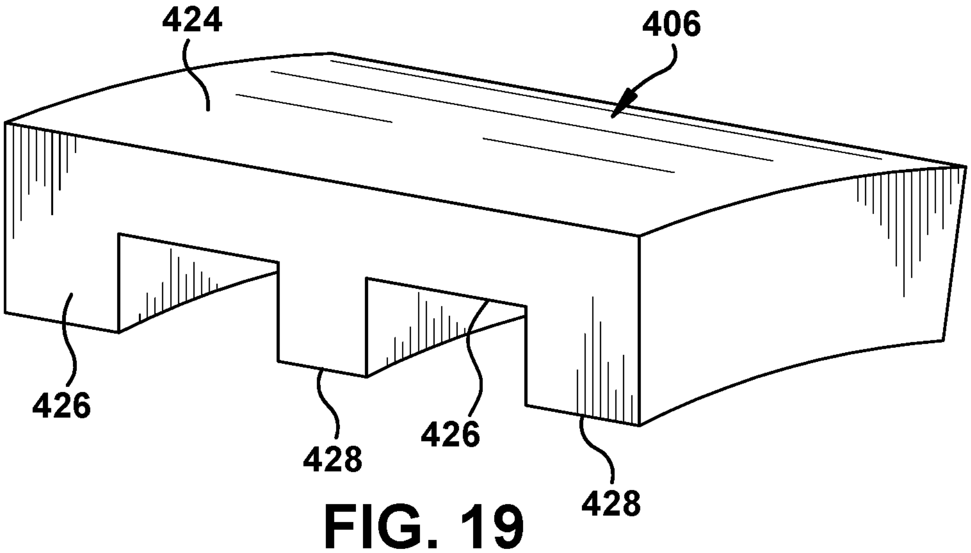
FIG. 19 shows a perspective view of an extension insert including three positioning legs, according to embodiments of the disclosure.

Any number of positioning legs 428 can be used on any extension insert 406. FIG. 18 shows an embodiment in which a single positioning leg 428 is used, and FIGS. 10-17, 19 and 20 show embodiments in which extension insert 406 includes a plurality of positioning legs 428 extending radially inward relative to axis A. FIGS. 10-17 show embodiments in which two positioning legs 428 are used, and FIG. 19 shows an embodiment in which three positioning legs 428 are used. More than three positioning legs 428 are also possible. As previously noted relative to FIG. 20, where plurality of positioning legs 428 are used, at least two of the plurality of positioning legs may have different lengths, e.g., leg 428A has length L2 and leg 428B has length L3 measured from first end 424 to a radially inward end of each leg.

Turbine blade assembly 400 can be formed using any now known or later developed technology such as but not limited to casting and additive manufacture. However, turbine blade 402 including dovetail 404 and airfoil 416 are formed together, but extension insert 406 is formed separately. In certain embodiments, extension insert 406 may include a lighter material than a material of the rest of turbine blade 402, i.e., airfoil 416 and dovetail 404. The lighter material may be any material having sufficient strength to function to hold dovetail 404 in rotor groove 410, and to withstand the environmental conditions in the turbine system in which used, e.g., combustion gas temperatures in a gas turbine, or steam temperatures in a steam turbine. In one example, dovetail 404 and airfoil 416 include high chrome or Inconel material, and extension insert 406 includes low chrome material. The use of different materials for dovetail 404 and extension insert 406 may also remove or reduce the need to machine the (typically) more expensive and harder to machine material in dovetail 404, which reduces expensive waste and saves time.

It is emphasized that the teachings of this disclosure, such as those embodiments expressly shown in FIGS. 10-21, can be intermixed in any manner. For example, any of the fixation elements 450 shown in FIGS. 14-17 can be used with any extension insert 406 in any of the other embodiments, e.g., in FIGS. 10-13 and 18-21.

Referring again to, for example, FIG. 10, a method of mounting assembly 400 may include providing rotor groove 410 defined in a rotor having axis A. Rotor groove 410 includes a radially inward facing rotor hook 430 and radially outward facing surface 432. As noted, providing rotor groove 410 may include machining rotor groove 410 to enlarge radial distance RD3 between radially inward facing rotor hook 430 and radially outward facing surface 432 of rotor groove 410, e.g., to remove aged or damaged surfaces thereof from prior use. As noted, assembly 400 may include turbine blade 402 including airfoil 416 and dovetail 404 coupled to airfoil 416. Dovetail 404 includes mounting arm 420 and end surface 422 facing radially inward relative to axis Z. A radial distance RD4 of dovetail 404, i.e., between mounting arm 420 and end surface 422, is insufficient to fill radial distance RD3 of rotor groove 410. Assembly 400 also includes extension insert 406 including first end 424 configured to contact end surface 422 of dovetail 404 and second end 426. Second end 426 includes at least one positioning leg 428 extending radially inward relative to axis A. Radial distance RD5 of extension insert 406 is set or adjusted to fill most, if not all, of radial distance RD3 of rotor groove 410 with radial distance RD4 of dovetail 404 to tightly mount turbine blade 402. Positioning leg(s) 428 may be adjusted, e.g., machined, to have radial distance RD6 between mounting arm 420 of dovetail 404 and radially inner end 438 of positioning leg(s) 428 match radial distance RD3 between radially inward facing rotor hook 330 and radially outward facing surface 332 of rotor groove 304. Any machining can be performed to remove material from radial inner end 438 of any positioning leg 428 to adjust its length.

FIG. 10, for example, shows mounting dovetail 404 of turbine blade 402 in rotor groove 410 and mounting extension insert 406 in rotor groove 410. The structures may be mounted in rotor groove 410 in any now known or later developed fashion, typically by sliding insertion of dovetail 404 and extension insert 406 into an open end of rotor groove 410. Dovetail 404 and extension insert 406 may be slid circumferentially along rotor groove 410 until they abut a dovetail 404 and extension insert 406 of an adjacent assembly 400. Note, in some cases, radially extending shims (not shown) may be placed between adjacent assemblies 400 to ensure proper circumferential positioning.

In certain cases, the method may include, prior to mounting turbine blade assembly 400 in rotor groove 410, adjusting positioning leg(s) 428, e.g., machined, to have radial distance RD6 between mounting arm 420 of dovetail 404 and radially inner end 438 of positioning leg(s) 428 match radial distance RD3 between radially inward facing rotor hook 330 and radially outward facing surface 332 of rotor groove 304. For example, any machining can be performed to remove material from radial inner end 438 of any positioning leg 428 to adjust its length. In certain cases, adjusting positioning leg(s) 428 may include adjusting them such that radial distance RD6 between mounting arm 420 and radially inner end 438 of positioning leg(s) 428 is less than radial distance RD3 between radially inward facing rotor hook 430 and radially outward facing surface 432 of rotor groove 410. In this case, as shown in FIGS. 12 and 13, the mounting may further include positioning at least one planar plate shim 440 between one or more positioning legs 428 (all in FIG. 12, only one in FIG. 13) and radially outward facing surface 432 of rotor groove 410. Any number of planar plate shims 440 can be provided to create a tight-fitting dovetail 404, extension insert 406 and rotor groove 410 connection. As shown in FIGS. 10, 12 and 13, mounting arm 420 engages radially inward facing rotor hook 430 of rotor groove 410 and positioning leg(s) 428 engage one of radially outward facing surface 432 of rotor groove 410 and planar plate shim 440 between positioning leg(s) 428 and radially outward facing surface 432 of rotor groove 410.

As noted previously, extension insert 406 has a radial extent between first end 424 and second end 426 and excluding any male portion of any male-female coupler (not shown in FIGS. 10-13) of larger than 4 millimeters. In contrast, where provided, each planar plate shim 440 may having a radial extent of no greater than 1.5 millimeter.

The method may also include locking a position of extension insert 406 relative to dovetail 404 of turbine blade 402 using fixation element 450, which may take any form described herein relative to FIGS. 14-17. As noted relative to FIGS. 18 and 19, any number of positioning legs 428 can be used in the method, and where a plurality of positioning legs 428 are used, they may have different lengths L2, L3.

Embodiments of the disclosure provide various technical and commercial advantages, examples of which are discussed herein. The various embodiments of turbine blade or turbine blade assembly can be used on all forms of turbine rotor grooves with any groove depth. The various embodiments also provide sufficient material to be re-machined to fit during servicing and after rotor groove enlargement. While the turbine blade or turbine blade assembly has been described as applicable in used turbine systems, it can also be used in new systems. In the latter case, it can be used, for example, for new blade dovetail designs requiring a relatively small dovetail within a larger rotor groove. This arrangement may be desired where a rotor needs a substantially larger rotor groove to reduce the groove stress concentration factor(s), but also needs a small dovetail to decrease the centrifugal stresses. In any case, the turbine blade or turbine blade assembly do not increase the blade (dovetail) weight and yet can fit into deeper rotor grooves, e.g., new grooves or those that have been serviced to remove any aged rotor area subject to cracking. The positioning leg(s) can be used to create a tight gap to the rotor groove bottom for radial positioning, or it/they may be used with plate shim(s) inserted under the legs to provide the right radial distance to the rotor seat. The teachings of the disclosure are applicable to any original equipment manufacturer's turbine systems (without requiring any new welding).

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A method, comprising:

providing a rotor groove defined in a rotor having an axis, the rotor groove including a radially inward facing rotor hook and a radially outward facing surface;

mounting a turbine blade assembly in the rotor groove, the turbine blade assembly including:

a turbine blade including an airfoil and a dovetail coupled to the airfoil, the dovetail including a mounting arm and an end surface facing radially inward relative to the axis; and an extension insert including a first end configured to contact the end surface of the dovetail and a second end, the second end including at least one positioning leg extending radially inward relative to the axis; and positioning at least one shim between a lowermost radially inward facing surface of the at least one positioning leg and the radially outward facing surface of the rotor groove.

2. The method of claim 1, wherein the mounting arm engages the radially inward facing rotor hook of the rotor groove.

3. The method of claim 1, wherein the extension insert has a radial extent larger than 4 millimeters, and the at least one shim having a radial extent of no greater than 1.5 millimeters.

4. The method of claim 1, further comprising locking a position of the extension insert relative to the dovetail of the turbine blade using a fixation element.

5. The method of claim 4, wherein the fixation element includes a male-female coupler.

6. The method of claim 5, wherein a female portion of the male-female coupler is defined in the end surface of the dovetail, and a male portion of the male-female coupler extends from the first end of the extension insert and is configured to seat within the female portion in the end surface to lock a position of the extension insert relative to the dovetail of the turbine blade.

7. The method of claim 4, wherein the fixation element includes a fastener coupling the end surface of the dovetail and the first end of the extension insert together.

8. The method of claim 1, wherein the at least one positioning leg includes a plurality of positioning legs extending radially inward relative to the axis.

9. The method of claim 8, wherein at least two of the plurality of positioning legs have different lengths.

10. The method of claim 1, further comprising, prior to mounting a turbine blade assembly in the rotor groove, adjusting the at least one positioning leg such that a first radial distance between the mounting arm and a radially inner end of the at least one positioning leg matches a second radial distance between the radially inward facing rotor hook and the radially outward facing surface of the rotor groove.

11. The method of claim 1, further comprising:

locking a position of the extension insert relative to the dovetail of the turbine blade using a male-female coupler, wherein the first end of the extension insert includes one of a male portion or a female portion of the male-female coupler and the end surface of the dovetail includes a corresponding one of the male portion or the female portion of the male-female coupler, such that when the first end of the extension insert contacts the end surface of the dovetail, the male portion seats within the female portion to lock the extension insert relative to the dovetail.

12. The method of claim 1, wherein each of the at least one positioning leg is axially offset from the center of the dovetail along the axis.

* * * * *